United States Patent
Bannister et al.

(10) Patent No.: US 10,737,282 B2
(45) Date of Patent: Aug. 11, 2020

(54) TANGENTIAL AIR CLEANER WITH COILED FILTER CARTRIDGE

(71) Applicant: Cummins Filtration IP, Inc., Columbus, IN (US)

(72) Inventors: Robert A. Bannister, Ames, IA (US); Arun P. Janakiraman, Stoughton, WI (US); Peter K. Herman, Stoughton, WI (US); Scott W. Schwartz, Cottage Grove, WI (US); Jeremiah Cupery, Madison, WI (US); Matthew Louison, McFarland, WI (US); Jason A. Scherck, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 218 days.

(21) Appl. No.: 15/766,945

(22) PCT Filed: Oct. 11, 2016

(86) PCT No.: PCT/US2016/056386
§ 371 (c)(1),
(2) Date: Apr. 9, 2018

(87) PCT Pub. No.: WO2017/066169
PCT Pub. Date: Apr. 20, 2017

(65) Prior Publication Data
US 2018/0290153 A1 Oct. 11, 2018

Related U.S. Application Data

(60) Provisional application No. 62/240,296, filed on Oct. 12, 2015.

(51) Int. Cl.
*B01D 45/12* (2006.01)
*B04C 3/06* (2006.01)
(Continued)

(52) U.S. Cl.
CPC ............... *B04C 3/06* (2013.01); *B01D 45/12* (2013.01); *B01D 46/002* (2013.01);
(Continued)

(58) Field of Classification Search
CPC ....... B04C 3/06; B04C 3/04; B04C 2009/002; B01D 46/10; B01D 46/0046;
(Continued)

(56) References Cited

U.S. PATENT DOCUMENTS 1,513,035 A * 10/1924 Donaldson ........... F02M 35/024
55/329
3,048,959 A * 8/1962 Lowther ............... F24F 3/1603
55/320

(Continued)

FOREIGN PATENT DOCUMENTS

| CN | 102527163 | 7/2012 |
|---|---|---|
| GB | 799 119 | 7/1958 |
| WO | WO 2014/181039 | 11/2014 |

OTHER PUBLICATIONS

First Office Action issued for Chinese Patent Application No. 2016800585968, dated Sep. 3, 2019, 7 pages.
(Continued)

*Primary Examiner* — Dung H Bui
(74) *Attorney, Agent, or Firm* — Foley & Lardner LLP

(57) ABSTRACT

Filtration systems having a tangential air cleaner having a coiled media filter element and a cyclonic pre-cleaner are described. An outer wall of the filter element acts as a pre-cleaner sleeve of the housing to generate a cyclonic flow of the intake air prior to the intake air being filtered by the filter element. The housing cover includes geometry that redirects the cyclonic flow from a tangential path to an axial, straight-through flow directed through an inlet flow face of the filter element. Various embodiments of such filtration
(Continued)

systems offer increased filter performance and capacity compared to similarly sized cylindrical pleated filter elements having a radial flow filtering path.

9 Claims, 23 Drawing Sheets

(51) Int. Cl.
  *B04C 3/04* (2006.01)
  *B01D 46/00* (2006.01)
  *B01D 46/10* (2006.01)
  *B01D 50/00* (2006.01)
  *F02M 35/022* (2006.01)
  *F02M 35/02* (2006.01)
  *B04C 9/00* (2006.01)
  *B01D 35/147* (2006.01)
  *B01D 46/52* (2006.01)

(52) U.S. Cl.
  CPC ......... *B01D 46/0046* (2013.01); *B01D 46/10* (2013.01); *B01D 46/106* (2013.01); *B01D 50/002* (2013.01); *B04C 3/04* (2013.01); *F02M 35/0216* (2013.01); *F02M 35/0223* (2013.01); *B01D 35/147* (2013.01); *B01D 46/521* (2013.01); *B01D 46/525* (2013.01); *B04C 2009/002* (2013.01)

(58) Field of Classification Search
  CPC .. B01D 50/002; B01D 46/002; B01D 46/106; B01D 45/12; B01D 35/147; B01D 46/521; B01D 46/525; F02M 35/0223; F02M 35/0216
  See application file for complete search history.

(56) References Cited

U.S. PATENT DOCUMENTS

| | | | |
|---|---|---|---|
| 3,078,650 A * | 2/1963 | Anderson | B01D 46/2411 55/337 |
| 3,362,155 A | 1/1968 | Driscoll | |
| 3,429,108 A * | 2/1969 | Larson | B01D 46/24 55/432 |
| 3,568,414 A * | 3/1971 | Spriggs | B01D 41/04 55/294 |
| 3,616,618 A * | 11/1971 | Gronholz | B01D 46/008 55/337 |
| 3,928,007 A | 12/1975 | Jackson | |
| 4,162,905 A * | 7/1979 | Schuler | B01D 45/16 55/337 |
| 4,217,118 A * | 8/1980 | Kopf | B01D 46/2411 55/330 |
| 4,486,206 A | 12/1984 | Miyakawa et al. | |
| 4,778,494 A | 10/1988 | Patterson | |
| 4,950,317 A * | 8/1990 | Dottermans | B01D 46/0002 29/235 |
| 5,180,257 A | 1/1993 | Narishima et al. | |
| 5,730,769 A * | 3/1998 | Dungs | B01D 46/0024 55/385.3 |
| 5,895,874 A | 4/1999 | Liao | |
| 7,364,601 B2 | 4/2008 | Xu et al. | |
| 8,397,920 B2 | 3/2013 | Moy et al. | |
| 9,212,636 B2 * | 12/2015 | Kaufmann | B01D 46/0046 |
| 2007/0181481 A1 | 8/2007 | Reynolds et al. | |
| 2012/0132573 A1 | 5/2012 | Lautzenheiser et al. | |

OTHER PUBLICATIONS

Donaldson Catalog Information, "FRG Air Cleaners, Superior protection for Larger Engines," https://www3.donaldson.com/en/catalogs/engine/033616.pdf, 14 pages, no date on document; downloaded Mar. 27, 2015.

International Search Report and Written Opinion issued for PCT/US2016/056386, dated Feb. 17, 2017, 18 pages.

M.Z. Abdullah, Z. Husain and S.M. Fraser,"Application of Deswirl Device in Cyclone Dust Separator," AJSTD vol. 20 Issue 3&4 pp. 203-2016 (2003).

* cited by examiner

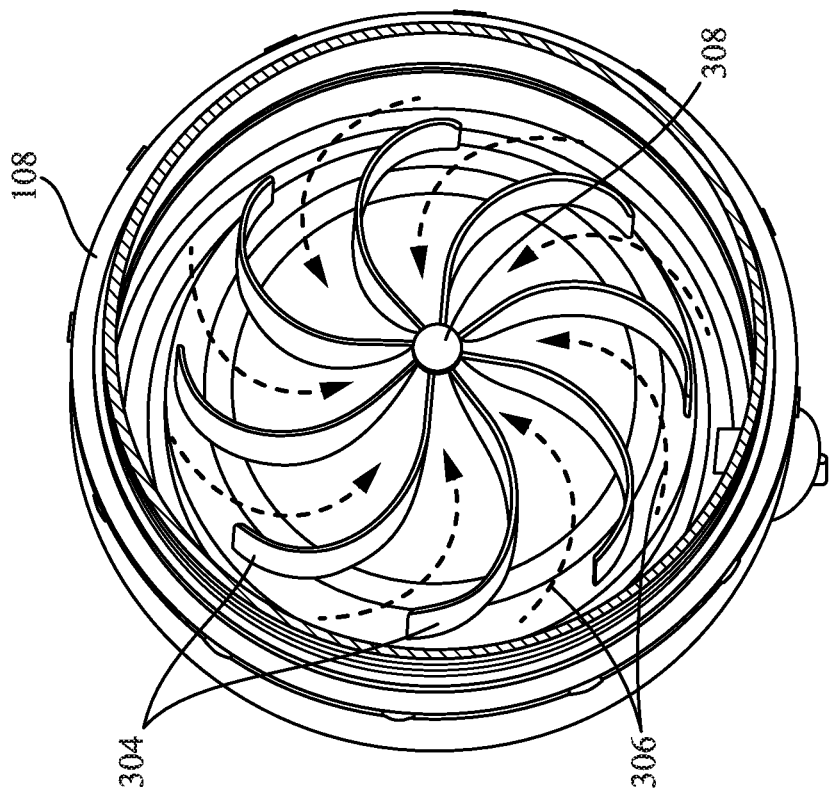
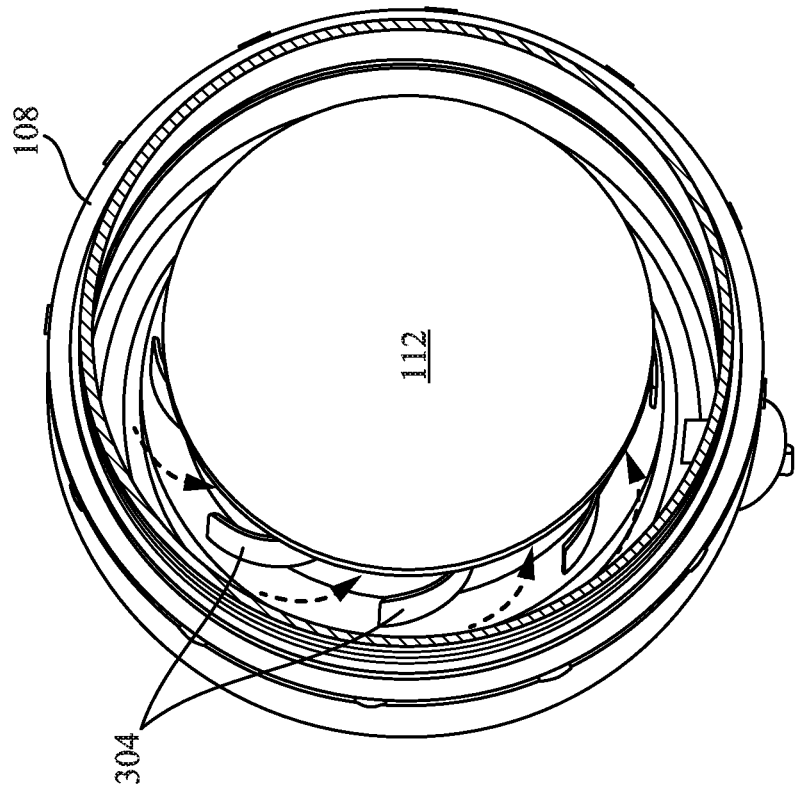

TANGENTIAL AIR CLEANER WITH COILED FILTER CARTRIDGE

CROSS-REFERENCE TO RELATED APPLICATIONS

This application is a National Stage of PCT Application No. PCT/US2016/056386, filed Oct. 11, 2016, which claims priority to U.S. Provisional Patent Application No. 62/240,296, entitled "TANGENTIAL AIR CLEANER WITH COILED FILTER CARTRIDGE," filed on Oct. 12, 2015, the contents which are herein incorporated by reference in their entirety and for all purposes.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, intake air is typically passed through a filter element to remove contaminants (e.g., particulates, dust, water, etc.) from the intake air prior to delivery to the engine. Many filtration systems utilize a pre-cleaner to remove a portion of the contaminants prior to the intake air passing through a filter element. For example, in filtration systems that utilize a pleated cylindrical filter element, intake air can be circulated around the filter element in a cyclonic pre-cleaner prior to passing radially through the cylindrical filter element. However, the use of cyclonic pre-cleaners with axial flow filter elements, such as coiled filter cartridges, cause substantial pressure drop, thereby reducing the performance of the filtration system.

SUMMARY

Various example embodiments relate to an air filtration system. One such system includes a housing defining a central compartment therein. The housing includes a radial air inlet and an axial air outlet positioned near a first end of the housing. The system further includes a cover removably coupled to a second end of the housing. The system includes a filter element positioned within the central compartment of the housing. The filter element includes a wound filter media. The filter element is arranged for axial flow filtration such that air to be filtered flows into a first axial face of the filter element, flows through the filter media, and flows out of the filter element at a second axial face of the filter element. The system further includes a plurality of de-swirl vanes positioned on the cover. The plurality of de-swirl vanes routing a flow of air into the filter element by changing the flow of air from a swirling flow to an axial flow towards the first axial face of the filter element.

Another example embodiment relates to a filtration system. The filtration system includes a pre-cleaner housing comprising an inlet configured to receive air to be filtered and a swirling device configured to cause the air to move through the pre-cleaner housing along a swirling flow path. The filtration system further includes a filter housing positioned downstream of the pre-cleaner housing in an air flow direction and configured to receive the air from the pre-cleaner housing. The filter housing comprises an outlet positioned downstream of the pre-cleaner housing and a central compartment positioned between the pre-cleaner housing and the outlet. The filtration system includes a filter element positioned in the central compartment. The filter element comprises filter media and a vortex finder. The filter media is configured to filter the air as the air flows through the filter housing. The vortex finder that comprises a wall that extends from an inlet face of the filter media into the pre-cleaner housing that prevents contaminant separated from the air by the swirling flow path from entering the filter media.

A further example embodiment relates to a filter element. The filter element includes filter media configured to filter air as the air flows through a filter housing of a filtration system when the filter element is installed in the filtration system. The filter element further includes a vortex finder comprising a wall. The vortex finder is configured to extend from an inlet face of the filter media into a pre-cleaner housing of the filtration system when the filter element is installed in the filtration system. The vortex finder is configured to prevent contaminant separated from the air upstream of the filter element from entering the filter media.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 2 through 5 show various cross-sectional views of the air filtration system of FIG. 1.

DETAILED DESCRIPTION

Referring to the figures generally, filtration systems having a tangential air cleaner having a coiled media filter element and a cyclonic pre-cleaner are described. An outer wall of the filter element acts as a pre-cleaner sleeve of the housing to generate a cyclonic flow of the intake air prior to the intake air being filtered by the filter element. The housing cover includes geometry that redirects the cyclonic flow from a tangential path to an axial, straight-through flow directed through an inlet flow face of the filter element. Various embodiments of such filtration systems offer increased filter performance and capacity compared to similarly sized cylindrical pleated filter elements having a radial flow filtering path. In other arrangements, various embodiments described herein relate to a filter element having an integrated vortex finder. In such arrangements, the vortex finder is integrated into an endcap or into a support structure of the filter element rather than being part of the pre-cleaner housing.

Figure 1:
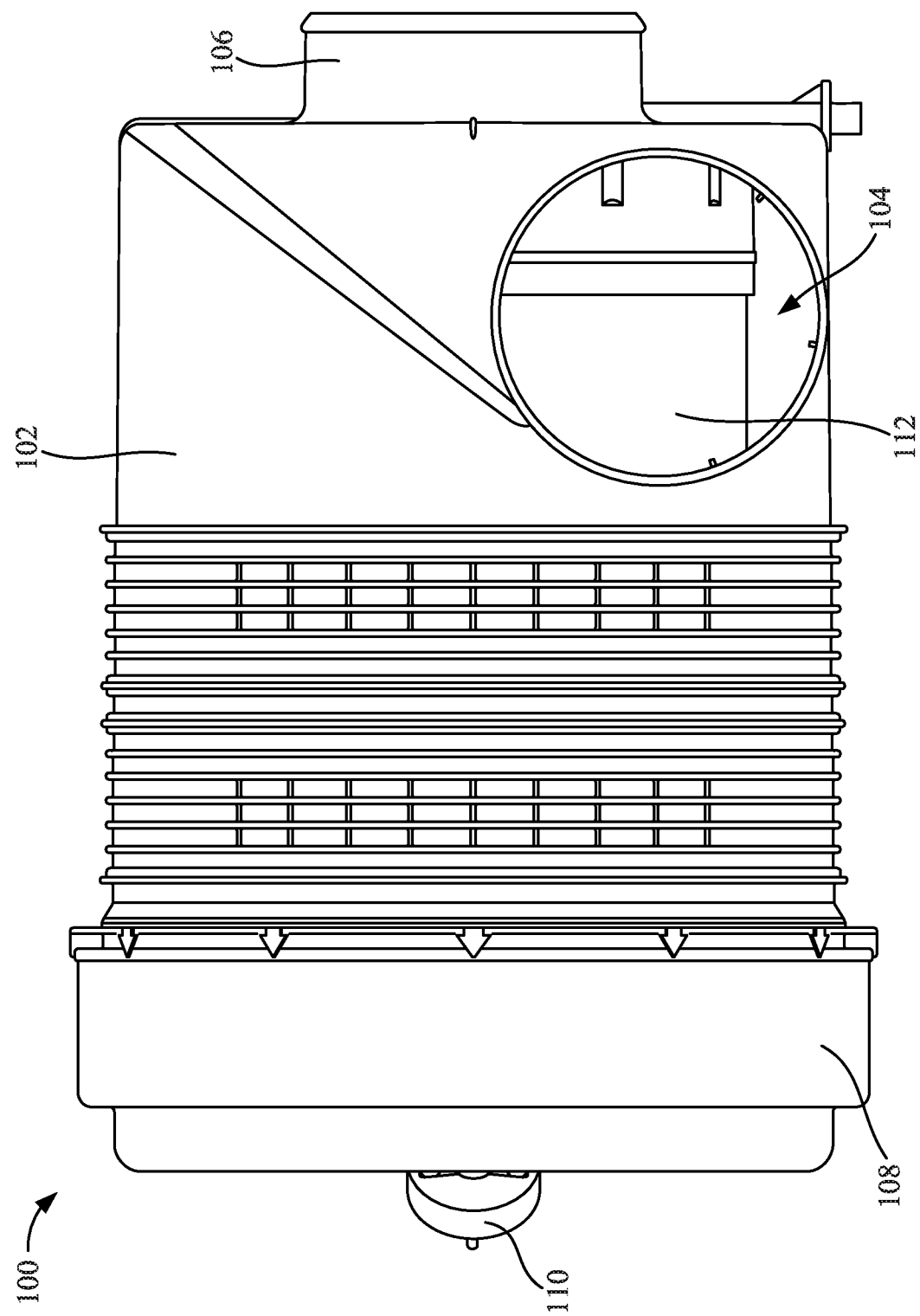
FIG. 1 shows a side view of an air filtration system according to an example embodiment.

Referring to FIG. 1, a side view of an air filtration system 100 is shown according to an example embodiment. The air filtration system 100 includes a cylindrical housing 102 forming a central compartment. The housing 102 includes a radial air inlet 104 and an axial air outlet 106. The radial air inlet 104 and the axial air outlet 106 are positioned near a first end of the housing 102. The housing 102 includes a cover 108. The cover 108 is removably coupled to a second end of the housing 102. The second end of the housing 102 is opposite the first end of the housing 102. The cover 108 includes a dust ejection port 110. A cylindrical filter element 112 is positioned within the central compartment of the housing 102. The cylindrical filter element 112 includes a wound filter media and is arranged for axial flow filtration. That is, air to be filtered flows into a first axial face of the filter element 112 (i.e., the inlet face of the filter element 112), the air passes through the wound filter media, and filtered air exits the filter element through a second axial face of the filter element 112 (i.e., the outlet face of the filter element 112). The second axial face of the filter element 112 is positioned adjacent to the axial air outlet 106. The first axial face of the filter element 112 is positioned adjacent to the cover 108.

In some arrangements, the filter element 112 is formed by a strip of filter media coaxially wound about a central axis of the filter element 112. The strip includes a pervious center corrugated sheet of filter media (e.g., a corrugated sheet) that defines a plurality of air flow channels extending parallel to the central axis. The filter media includes a first pervious facing sheet of flat filter media is disposed on a first side of the corrugated sheet for defining a first plurality of axial air flow channels with the first side of the corrugated sheet. The filter media includes a second pervious facing sheet of filter media disposed on a second side of the corrugated sheet for defining a second plurality of axial air flow chambers with the second side of the corrugated sheet. The formed axial air flow channels extend from a first face of the filter media (e.g., the inlet face of the filter element 112) to a second face of the filter media (e.g., the outlet face of the filter element 112). Each of the plurality of axial air flow channels are alternately sealed at the first face of the filter media or the second face of the filter media such that air flowing into a first axial air flow channel must pass through the filter media to an adjacent, second axial air flow channel to exit the filter media.

In other arrangements, the filter element 112 is formed from a filter media having tetrahedron-shaped features and flat media that is rolled or layered to form the filter element 112. In such arrangements, the filter element 112 includes an upstream inlet and a downstream outlet. The filter media is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet. The filter element 112 includes a plurality of wall segments extending in serpentine manner between the bend lines. The wall segments extend axially and define axial channels there between. The channels have a height along a transverse direction that is perpendicular to the axial direction. The channels having a lateral width along a lateral direction that is perpendicular to the axial direction and perpendicular to the transverse direction. At least some of the bend lines taper in the transverse direction as they extend axially in the axial direction. The wall segments extend in the serpentine manner and define a laterally extending serpentine span having a first wall segment laterally adjacent a second wall segment and joined thereto by a first bend line and continuing in the serpentine manner along the serpentine span to a third wall segment laterally adjacent the second wall segment and joined thereto by a second bend line, and so on along the serpentine span. The serpentine span extends along the lateral direction such that the taper of the bend lines tapering in the transverse direction is perpendicular to the serpentine span along the lateral direction. The wall segments include a first set of wall segments alternately sealed to each other at the upstream inlet to define a first set of channels having open upstream ends, and a second set of channels interdigitated with the first set of channels and having closed upstream ends. The wall segments include a second set of wall segments alternately sealed to each other at the downstream outlet to define a third set of channels having closed downstream ends, and a fourth set of channels interdigitated with the third set of channels and having open downstream ends. The first set of bend lines include a first subset of bend lines that define the first set of channels, and a second subset of bend lines that define the second set of channels. The second subset of bend lines taper in the transverse direction as they extend from the upstream inlet axially towards the downstream outlet. The second set of bend lines includes a third subset of bend lines that define the third set of channels. A fourth subset of bend lines defines the fourth set of channels. The fourth subset of bend lines taper in the transverse direction as they extend from the downstream outlet axially towards the upstream inlet. A detailed description of the above-described tetrahedron filter media can be found in U.S. Pat. No. 8,397,920, which is herein incorporated by reference in its entirety and for all purposes.

Figure 2:
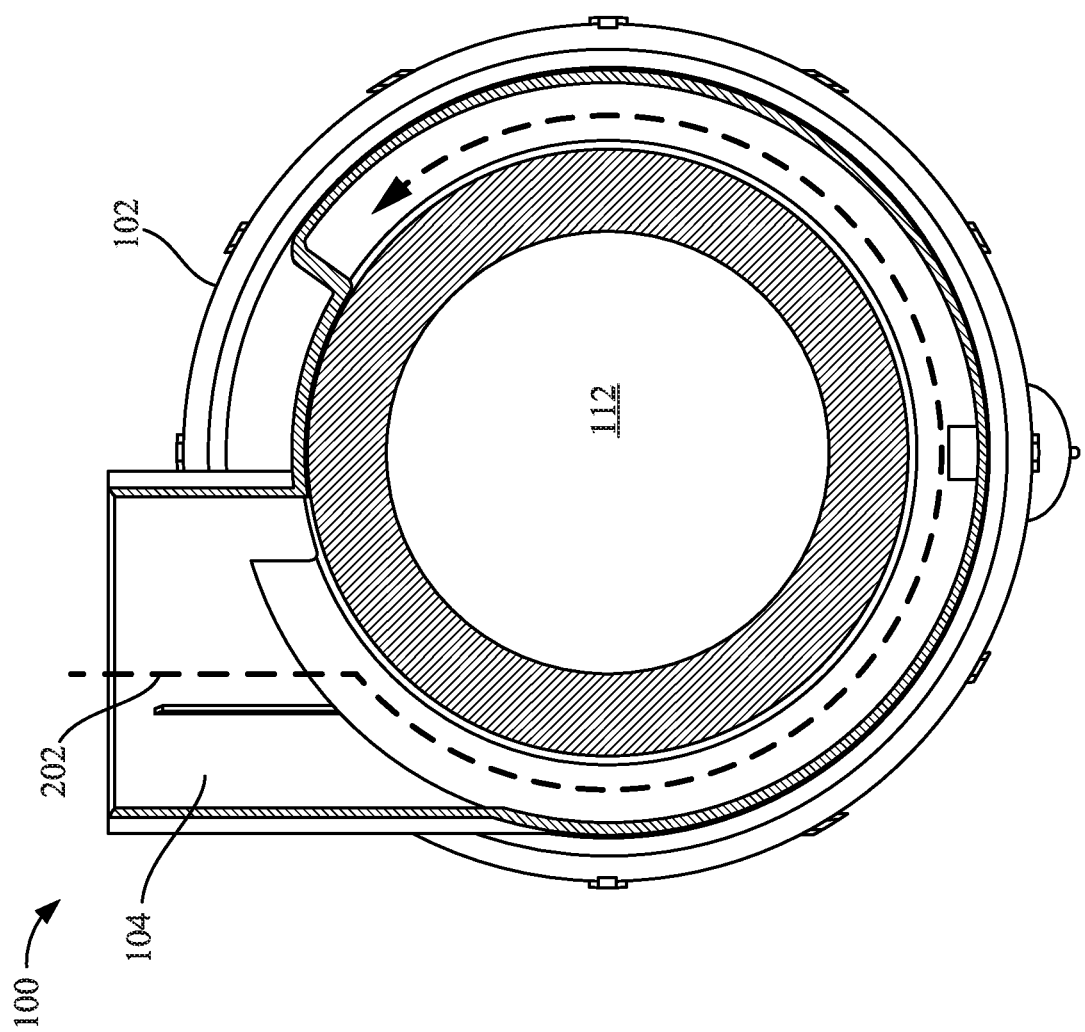
Figure 3:
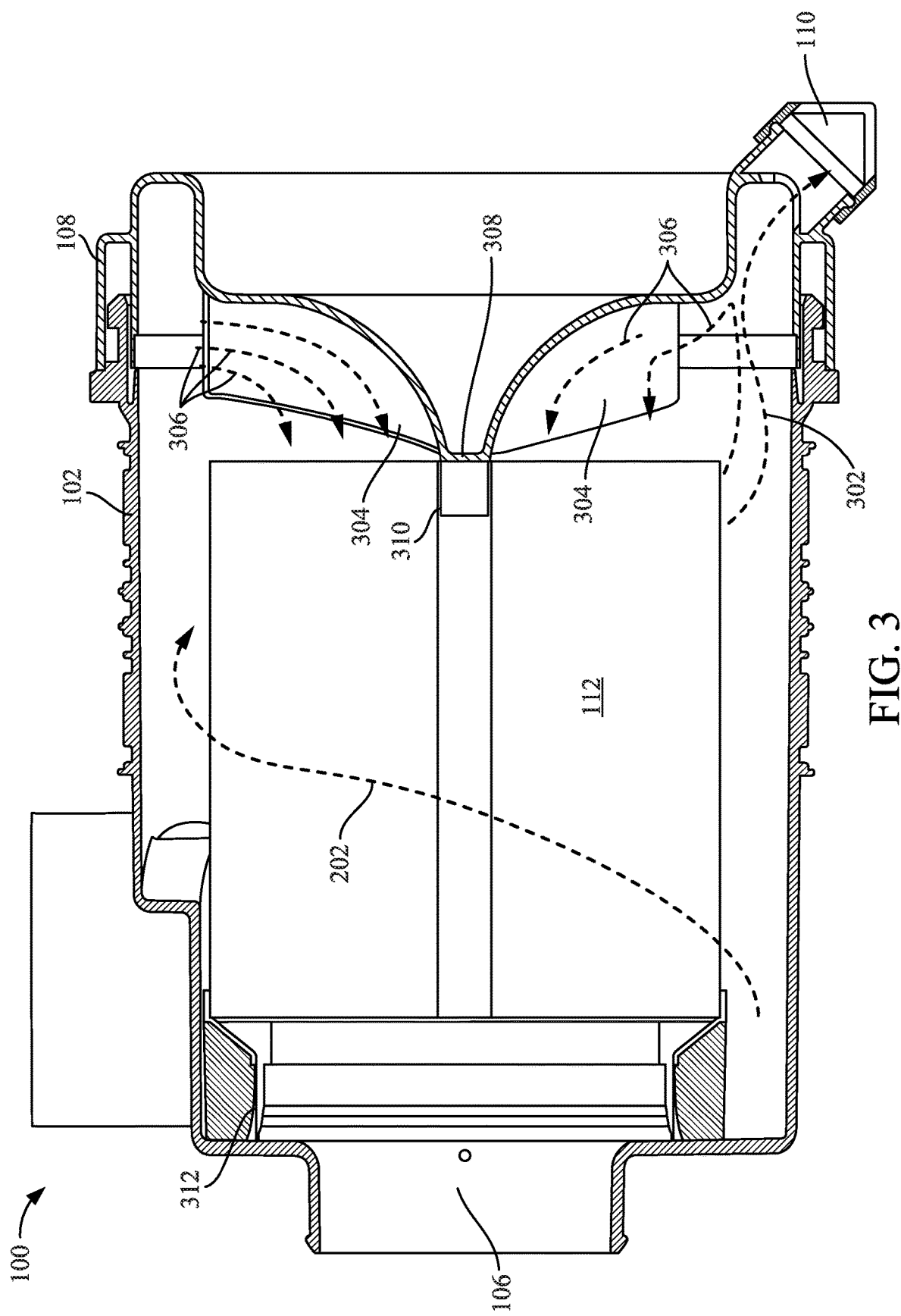

As shown in FIGS. 2 and 3, air to be filtered enters the filtration system 100 through the radial air inlet 104 and follows flow path 202. The air impacts the sidewall of the filter element 112. The air is then routed around the filter element 112 in a swirling manner as shown by flow path 202 because the filter element 112 is an axial flow filter element, not a radial flow filter element. In some arrangements, the sidewall of the filter element 112 is an impermeable sleeve that protects the outer surface of the filter element 112 from damage during shipping and installation. In other arrangements, the side wall of the filter element 112 is composed of permeable filter media. In such arrangements, a small quantity of the air may pass through the filter element side wall. The swirling flow path 202 separates at least a portion of the contaminants (shown as arrow 302) from the air, such as dust and dirt, through the centrifugal force generated by the swirling air flow. The separated contaminants fall to the dust ejection port 110. Accordingly, the swirling flow path 202 functions as a cyclonic pre-cleaner.

Figure 7:
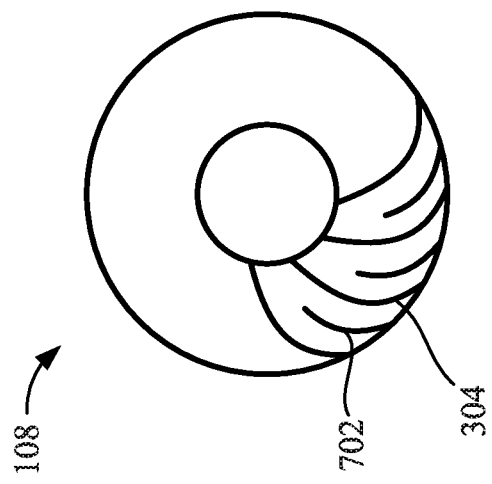
FIGS. 6 and 7 show top views of de-swirl vane arrangements of the air filtration system of FIG. 1.
Figure 6:
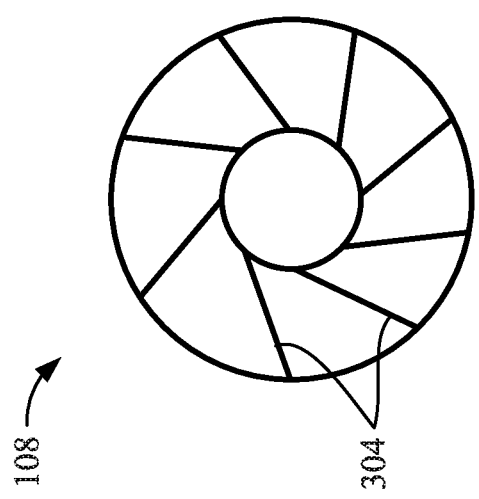

Referring to FIGS. 3 through 7, the cover 108 includes a plurality of de-swirl vanes 304. Accordingly, as the tangential flow approaches the second end of the housing 102, the inner edge of the air flow engages the de-swirl vanes 304 of the cover 108. The de-swirl vanes 304 route the air towards the first axial face (i.e., the inlet face) of the filter element 112 by changing the direction of the flow path 202 from a tangential swirling flow (e.g., as shown in flow path 202 as best seen in FIGS. 2 and 3) into an axial flow (as shown by arrows 306). Accordingly, the de-swirl vanes 304 align the air flow for entrance into the first axial face of the filter element 112 such that the air can be filtered by the filter element 112. In doing so, the de-swirl vanes 304 convert at least a portion of the swirling flow velocity head back to pressure by redirecting flow into the filter element 112 inlet face thereby reducing the air flow pressure drop caused by the filtration system 100. Further, the de-swirl vanes 304 prevent Rankine vortex formation within the housing 102. In some arrangements (e.g., as shown in FIGS. 4-6), the de-swirl vanes 304 are spiral in shape (e.g., log-spiral, hyperbolic spiral, or the like). In other arrangements, the de-swirl vanes 304 are planar in shape and radially offset (e.g., as shown in FIG. 7). In further arrangements, the de-swirl vanes 304 include splitter vanes 702 that provide for a high density of vanes without requiring expensive manufacturing costs.

Referring again to FIG. 3, the cover 108 includes an extension portion 308. The extension portion 308 engages a mandrel 310 of the filter element 112 to align and secure the filter element 112 within the housing 102. When the cover 108 is secured to the housing 102 (e.g., via a snap-fit connection), the cover 108 holds the filter element 112 to prevent back off from a sealing surface 312 of the housing 102. A seal member (e.g., a polyurethane seal) forms a seal between the filter element 112 and the housing 102 thereby preventing bypass of the air from the radial air inlet 104 to the axial outlet 106.

Figure 8:
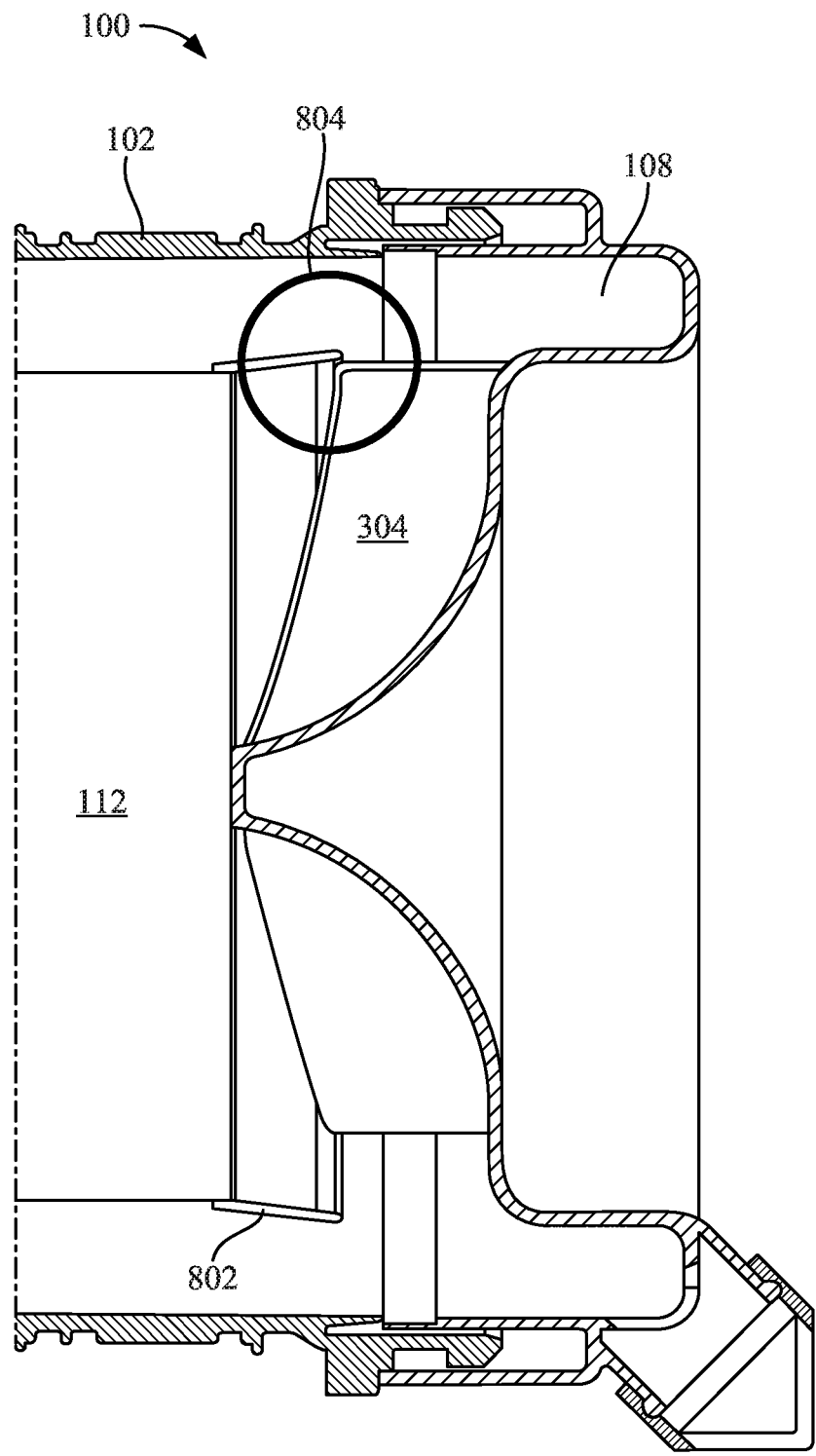
FIG. 8 shows a cross sectional view of the air filtration system of FIG. 1 fitted with a circumferential extension around the filter element.

Referring to FIG. 8, in some arrangements, the filter element 112 includes a circumferential extension 802. The circumferential extension 802 is coupled to the filter element 112 at the inlet axial face of the filter element 112. The circumferential extension 802 comprises a locating flow direction ring. The circumferential extension 802 engages with outer portions of the de-swirl vanes 304 of the cover 108 to help center the filter element 112 with respect to the cover 108 (e.g., as shown in section 804). Additionally, the circumferential wall of the circumferential extension 802 is angled away from the central axis of the filter element 112. The angled circumferential wall assists in diverting the pre-cleaned contaminant out of the air flow and towards the inner wall of the housing 102 before the air is redirected, by the de-swirl vanes 304, towards and into the first axial face of the filter element 112.

Figure 9:
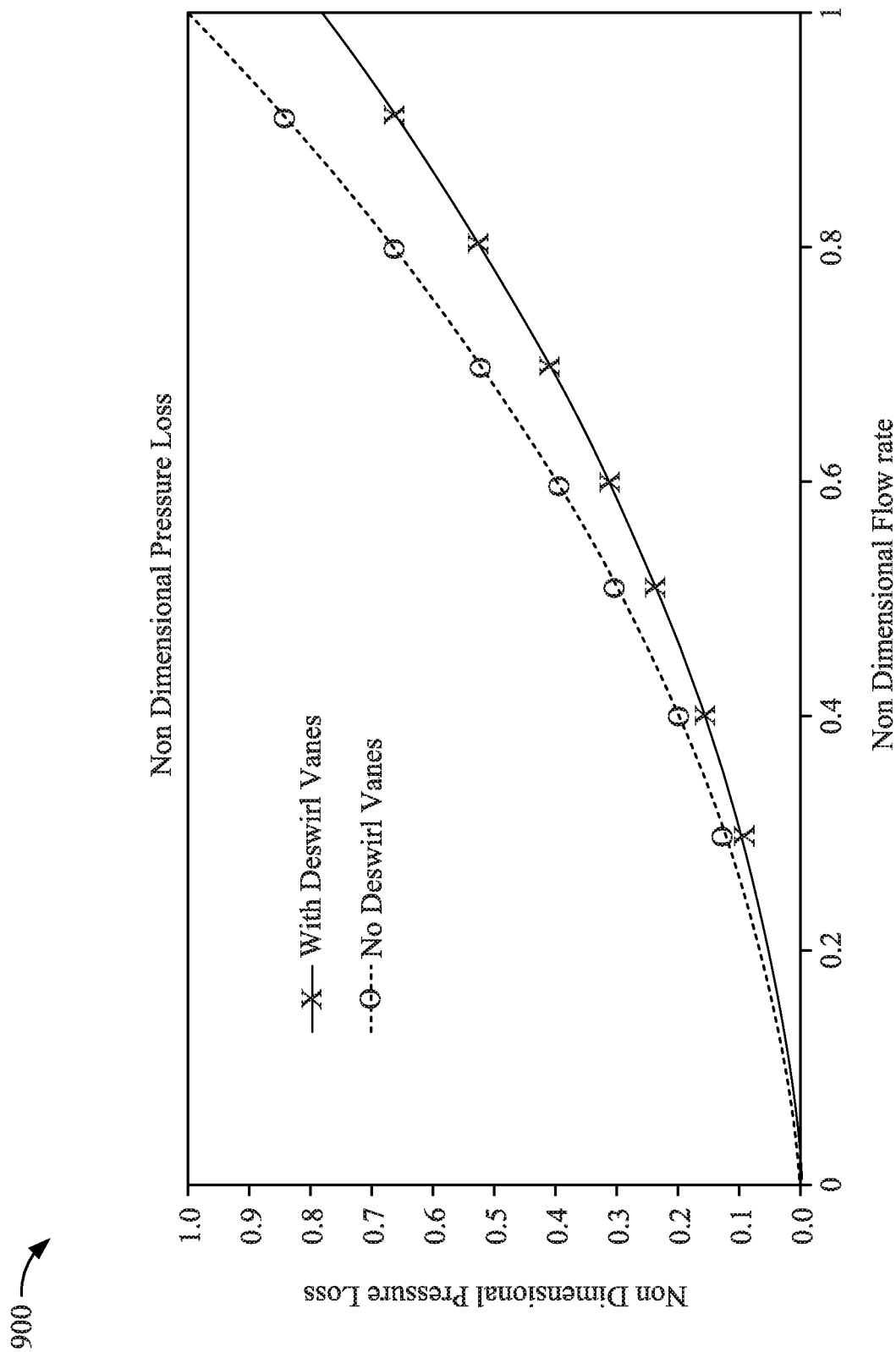
FIGS. 9 through 15 show example air flow and pressure drop analyses comparing air filtration systems having de-swirl vanes and air filtration systems without de-swirl vanes.

As discussed above, the inclusion of the de-swirl vanes 304 reduces the pressure drop caused by the filtration system 100. FIGS. 9 through 15 provide example air flow analyses showing the reduced pressure drop in filtration systems employing the de-swirl vanes 304. As shown in FIG. 9, a line graph 900 of non-dimensional pressure loss vs. non-dimensional flow rate is shown for two filtration systems: a first filtration system having de-swirl vanes (X) and a second filtration system without de-swirl vanes (0). The first filtration system may be, for example, filtration system 100. As such, the first filtration system includes de-swirl vanes (e.g., de-swirl vanes 304). The second filtration system is substantially the same as the first filtration system (in arrangement, size, and operating parameters), except the second system does not have de-swirl vanes. As shown in graph 900, the second filtration system experiences a higher non-dimensional pressure loss than the first filtration system.

Figure 11:
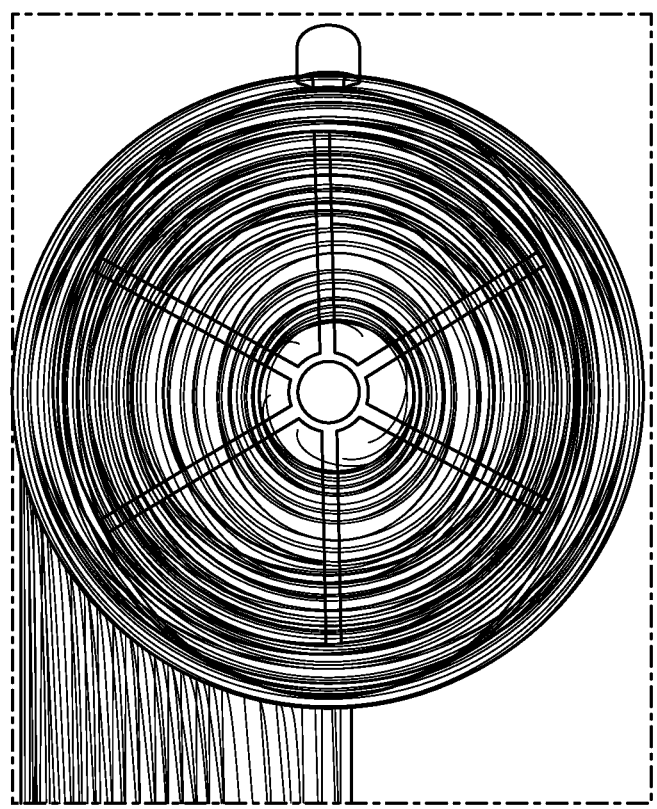
Figure 10:
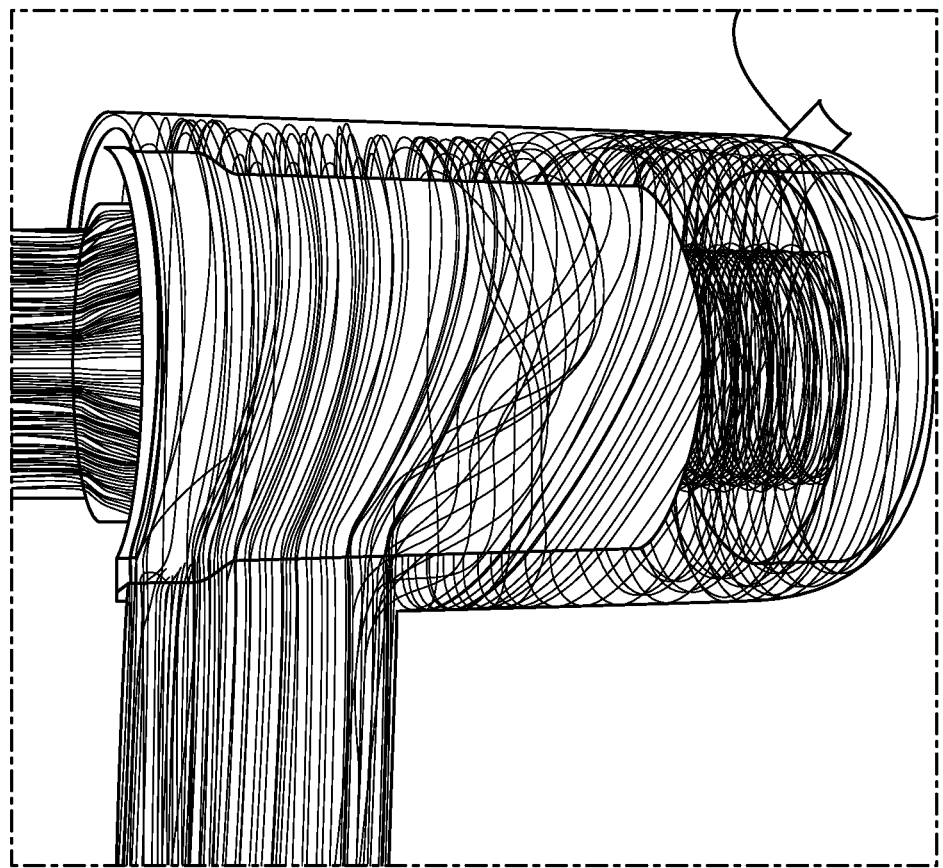
Figure 13:
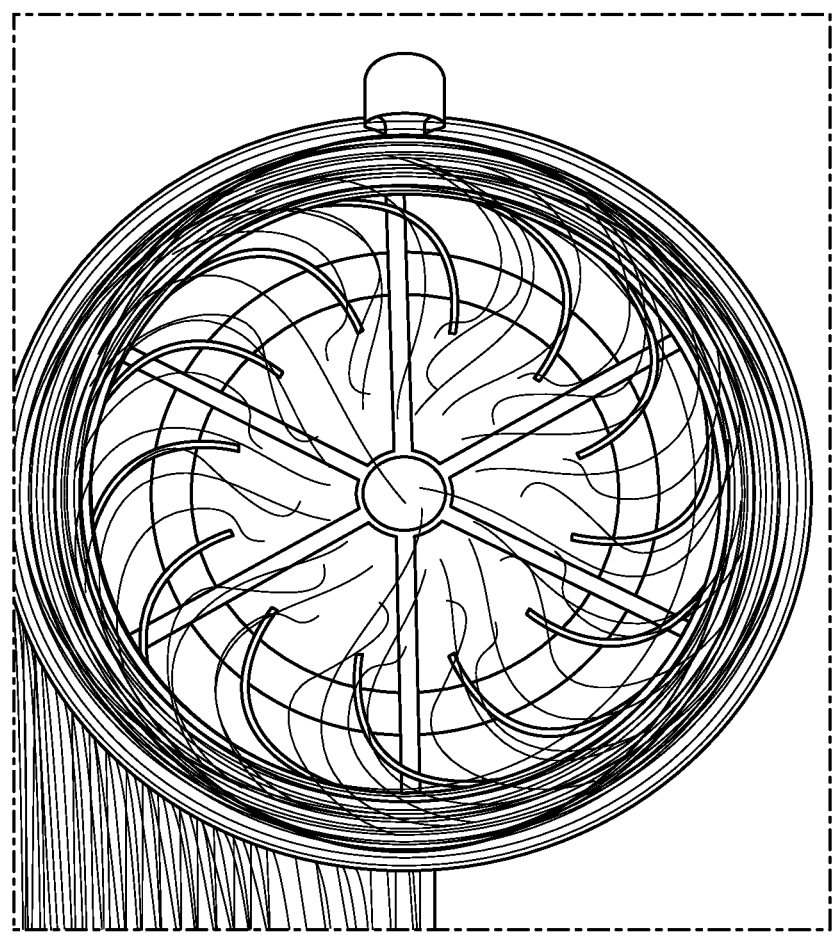
Figure 12:
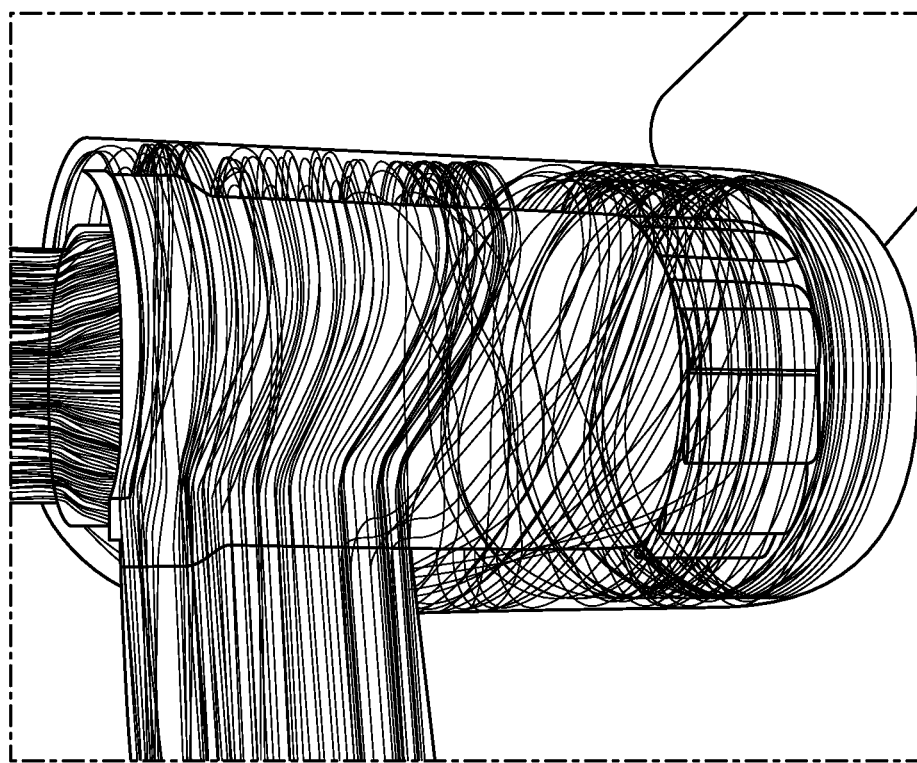

Referring to FIGS. 10 through 13, air flow diagrams of the first filtration system and the second filtration system are shown to further demonstrate the more efficient flow of the first filtration system. As shown in FIGS. 10 and 11, which demonstrate example air flow paths for the second filtration system without the de-swirl vanes, the air flow enters the inlet face of the filter element 112 in a swirling manner. This is not optimal because the filter element 112 is an axial flow filter element. The non-optimal air flow into the filter element 112 contributes to the increased pressure drop of the second filtration system. As shown in FIGS. 12 and 13, which demonstrate example air flow paths for the first filtration system having the de-swirl vanes 304, the air flow is turned from a swirling flow into a substantially axial flow prior to entering the inlet face of the filter element. Accordingly, when the de-swirl vanes 304 are employed, the air enters the filter element 112 in a more-optimal air flow path than in arrangements without the de-swirl vanes 304.

Figure 14A:
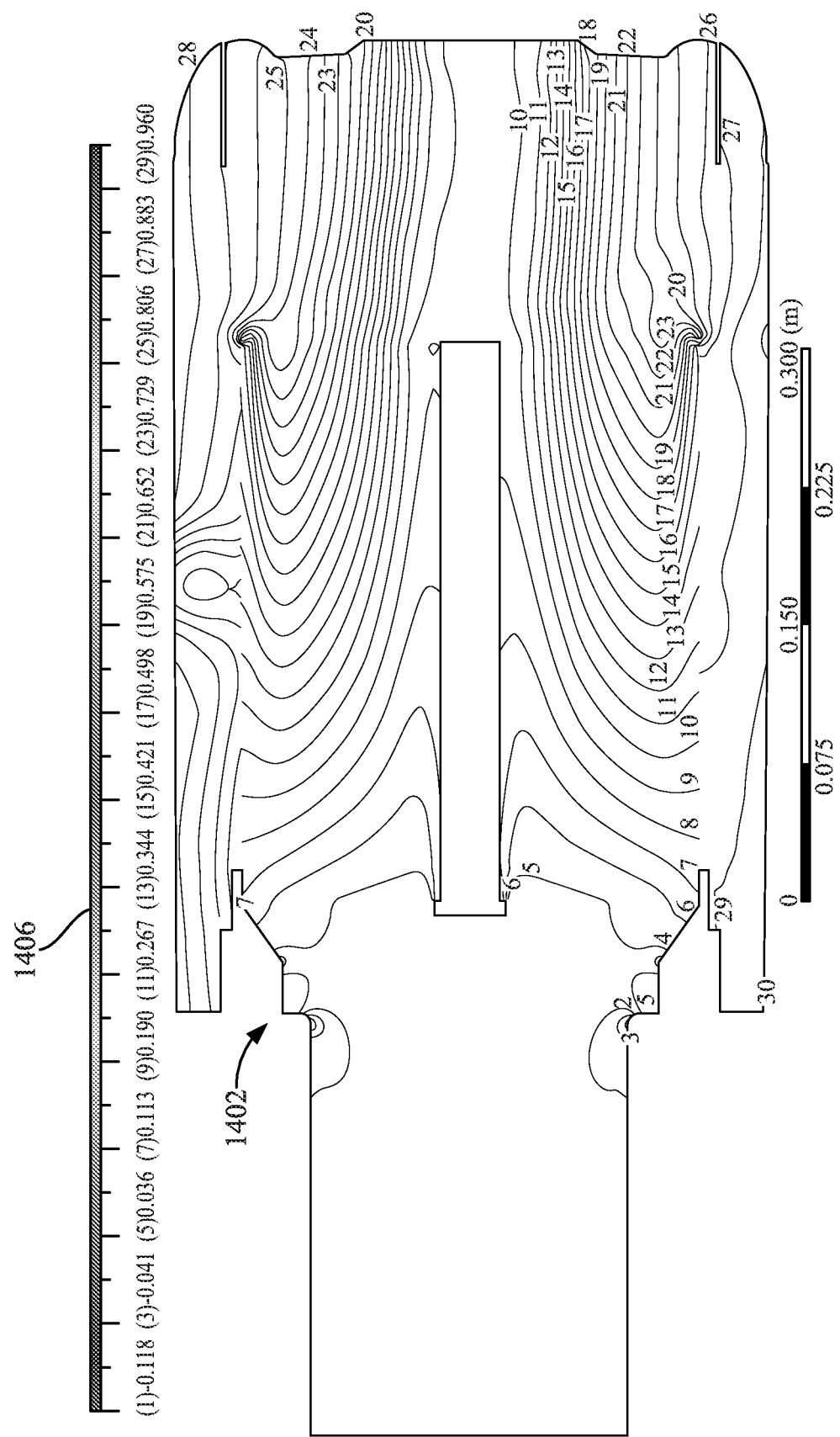
Figure 14B:
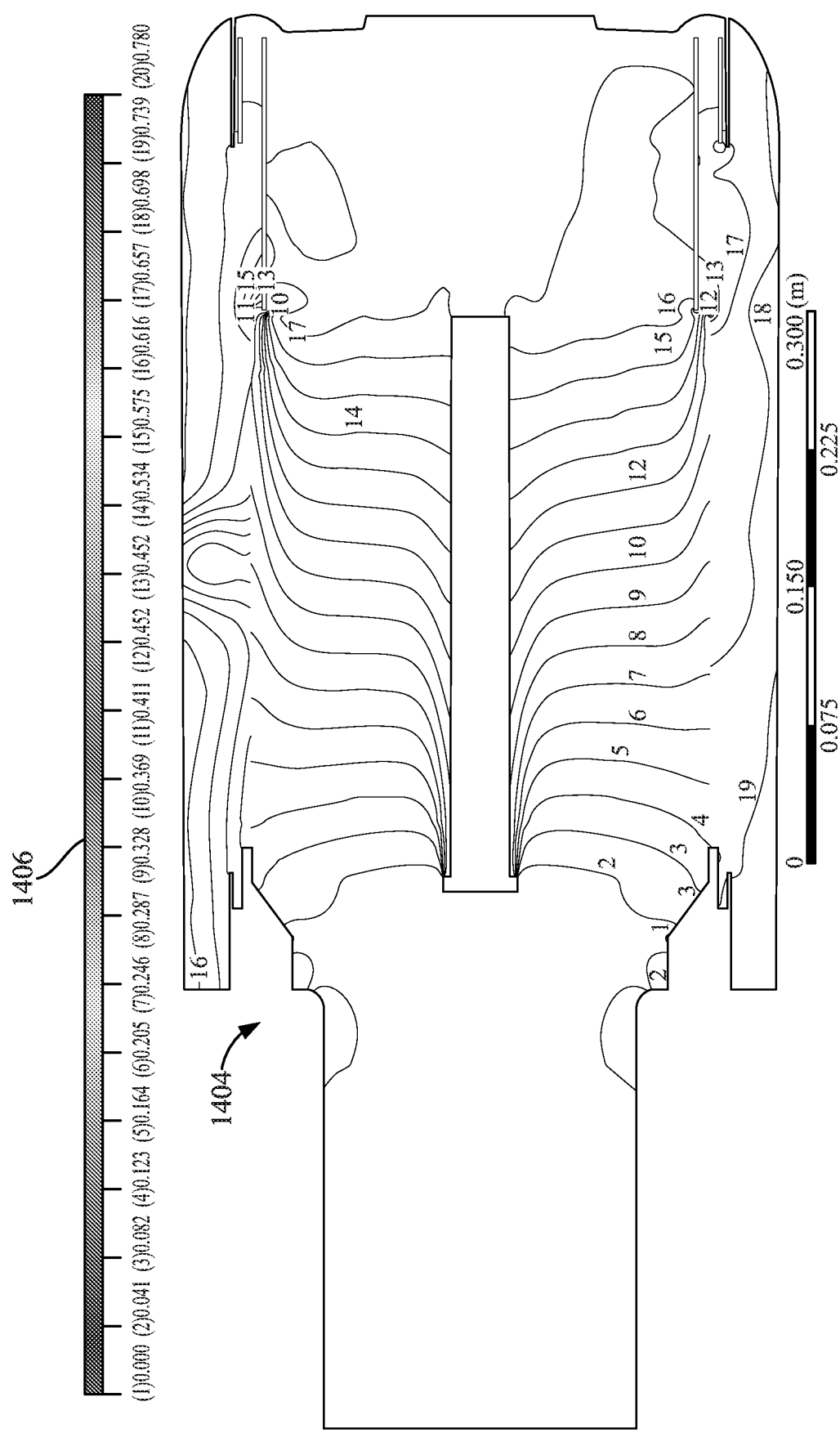

Referring to FIGS. 14A and 14B, pressure contour analysis diagrams are shown comparing the operational air pressures of the first filtration system with the de-swirl vanes 304 (shown at 1404 in FIG. 14B) to the second filtration system without the de-swirl vanes 304 (shown at 1402 in FIG. 14A). A scale of non-dimensional pressures is shown at 1406. As shown in FIGS. 14A and 14B, the first filtration system with the de-swirl vanes 304 experiences a less drastic pressure drop at the inlet face of the filter element than the second filtration system.

Figure 15:
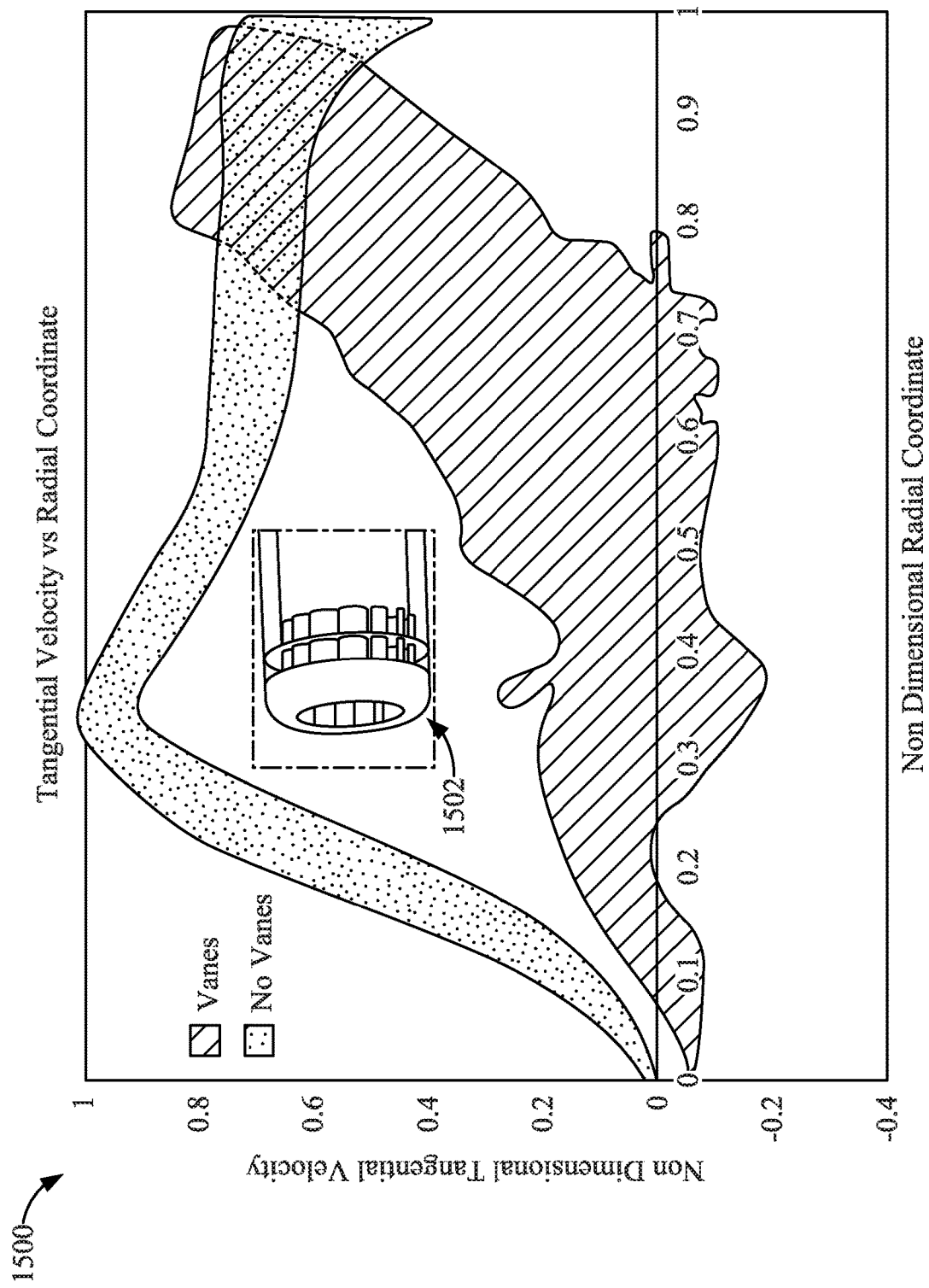

Referring to FIG. 15, a tangential velocity distribution 1500 taken at a plane midway between the filter element 112 inlet and housing 102 end wall is shown for the first filtration system (having the de-swirl vanes 304) and the second filtration system (without the de-swirl vanes 304). As shown in the tangential velocity distribution 1500, tangential velocity is reduced by the de-swirl vanes 304 of the first filtration system (i.e., the free-vortex core 1502) where non-dimensional V-tan approaches 1 is suppressed.

Figure 16:
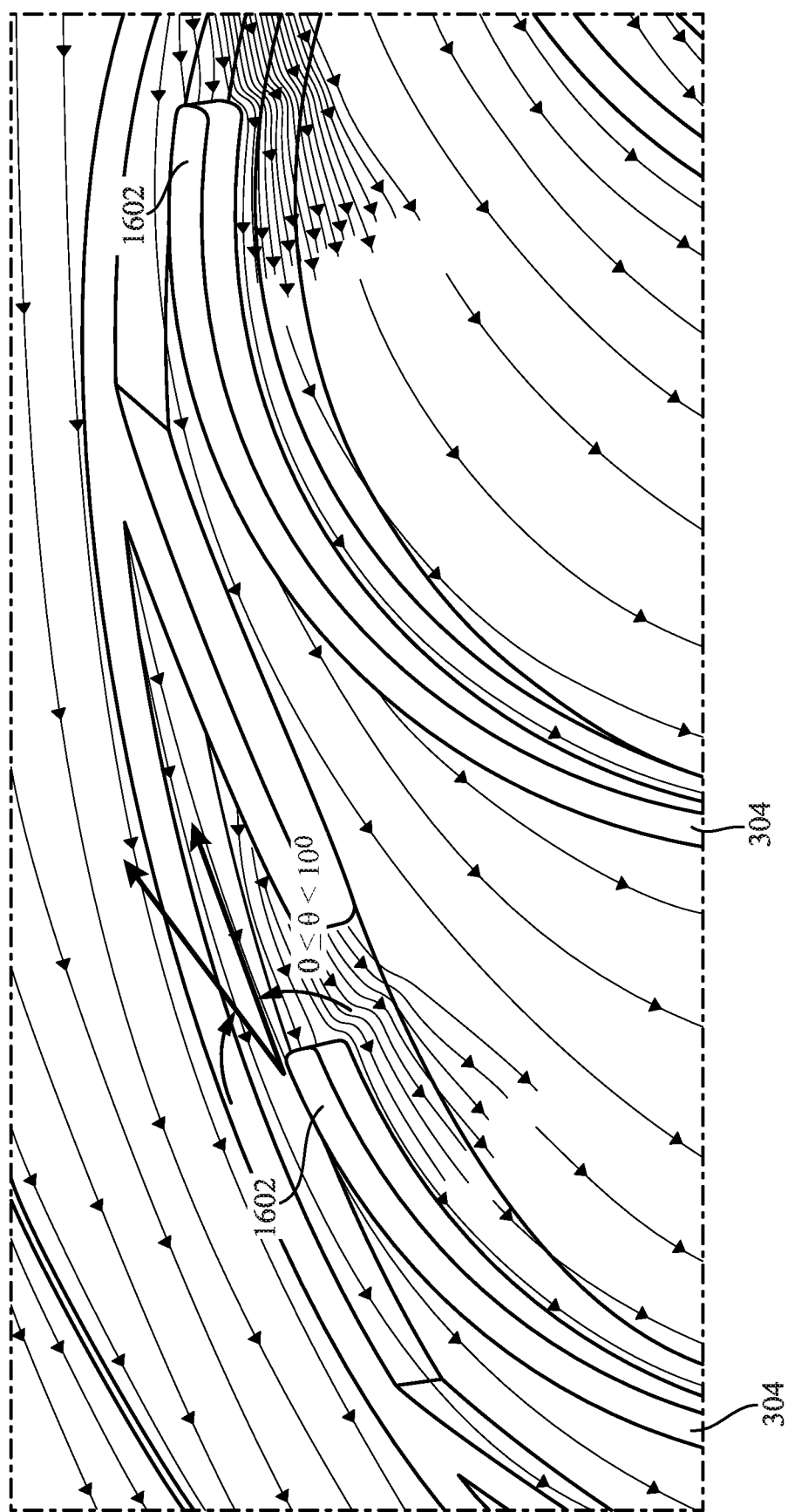
FIG. 16 shows a close up perspective view of the de-swirl vanes of the air filtration system of FIG. 1.

Referring again to FIGS. 3 through 7, the de-swirl vanes 304 form guides that turn the air flow from the swirling air path 202 into the axial air path represented by arrows 306. As shown in FIG. 16, the leading edges 1602 of the de-swirl vanes 304 are oriented such that the relative angle θ between the flow vectors of the air flow and the leading edges 1602 is between zero degrees and ten degrees. In some arrangements, relative angle θ between the flow vectors of the air flow and the leading edges 1602 is zero degrees and causes minimal flow separation.

Figure 17:
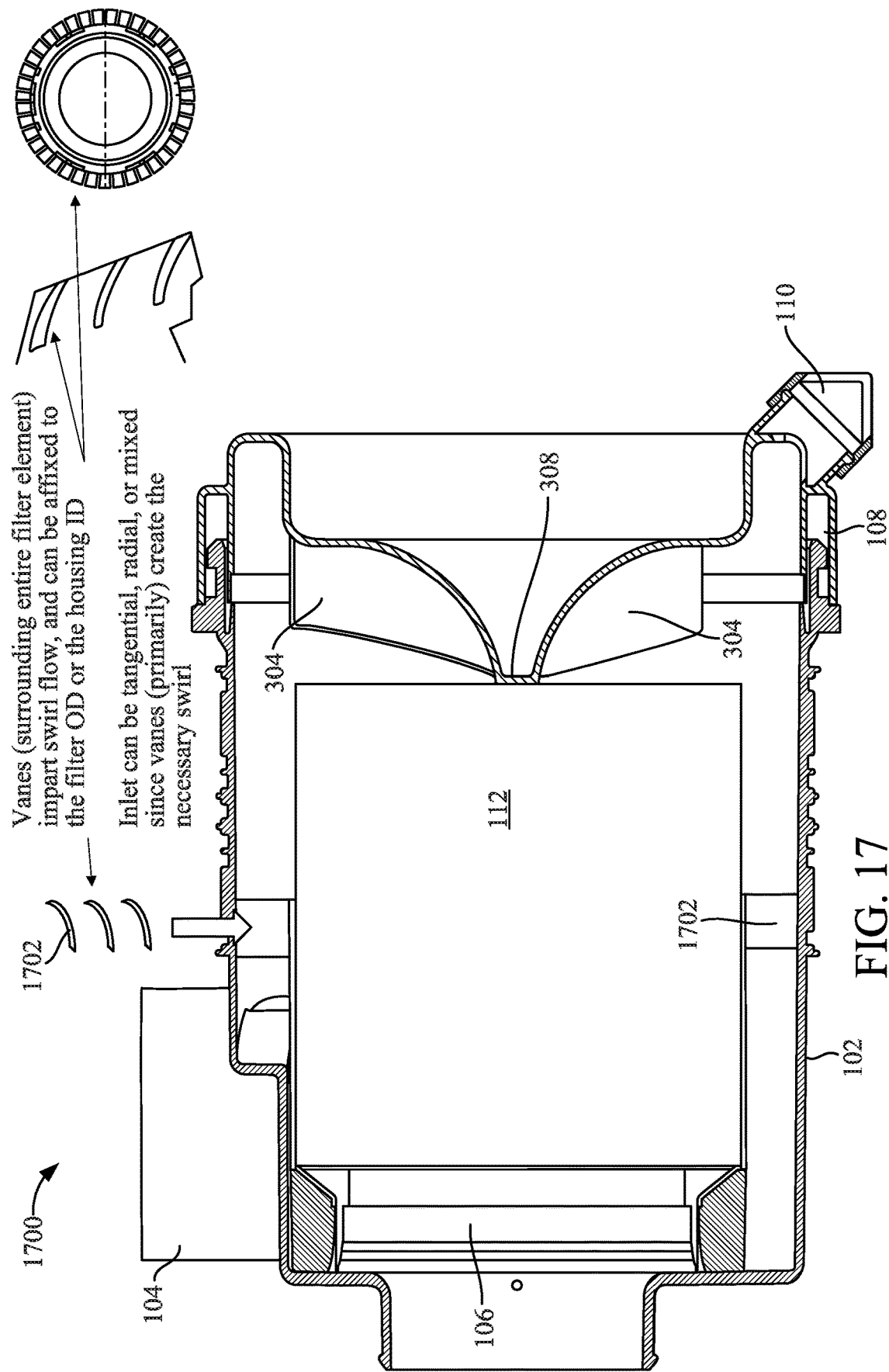
FIG. 17 shows a cross-sectional view of an air filtration system according to another example embodiment.

Referring to FIG. 17, a cross-sectional view of a filtration system 1700 is shown according to an example embodiment. The filtration system 1700 is similar to the above-described filtration system 100. As such, like numbering is used to describe shared components between the filtration systems 100 and 1700. The primary difference between filtration systems 1700 and 100 is that filtration system 1700 includes additional circumferential vanes 1702 surrounding a portion of the filter element 112. In some arrangements, the circumferential vanes 1702 cover an entire circumference of the filter element 112 around the portion of the filter element. The circumferential vanes 1702 create or enhance the tangential, swirling air flow path (e.g., path 202 shown in FIGS. 2 and 3). In some arrangements, the circumferential vanes 1702 are coupled to the filter element 112. In other arrangements, the circumferential vanes 1702 are coupled to the inner wall of the housing 102. In each arrangement, the circumferential vanes 1702 also assist in centering the filer element 112 within the housing 102 during installation of the filter element 112. The circumferential vanes 1702 also allow the radial air inlet 104 to be repositioned as a straight-radial inlet, a partially offset radial inlet, or a fully tangential radial inlet because the air flow will be reoriented by the circumferential vanes 1702 to create the tangential swirling air flow path used for pre-cleaning.

Figure 18:
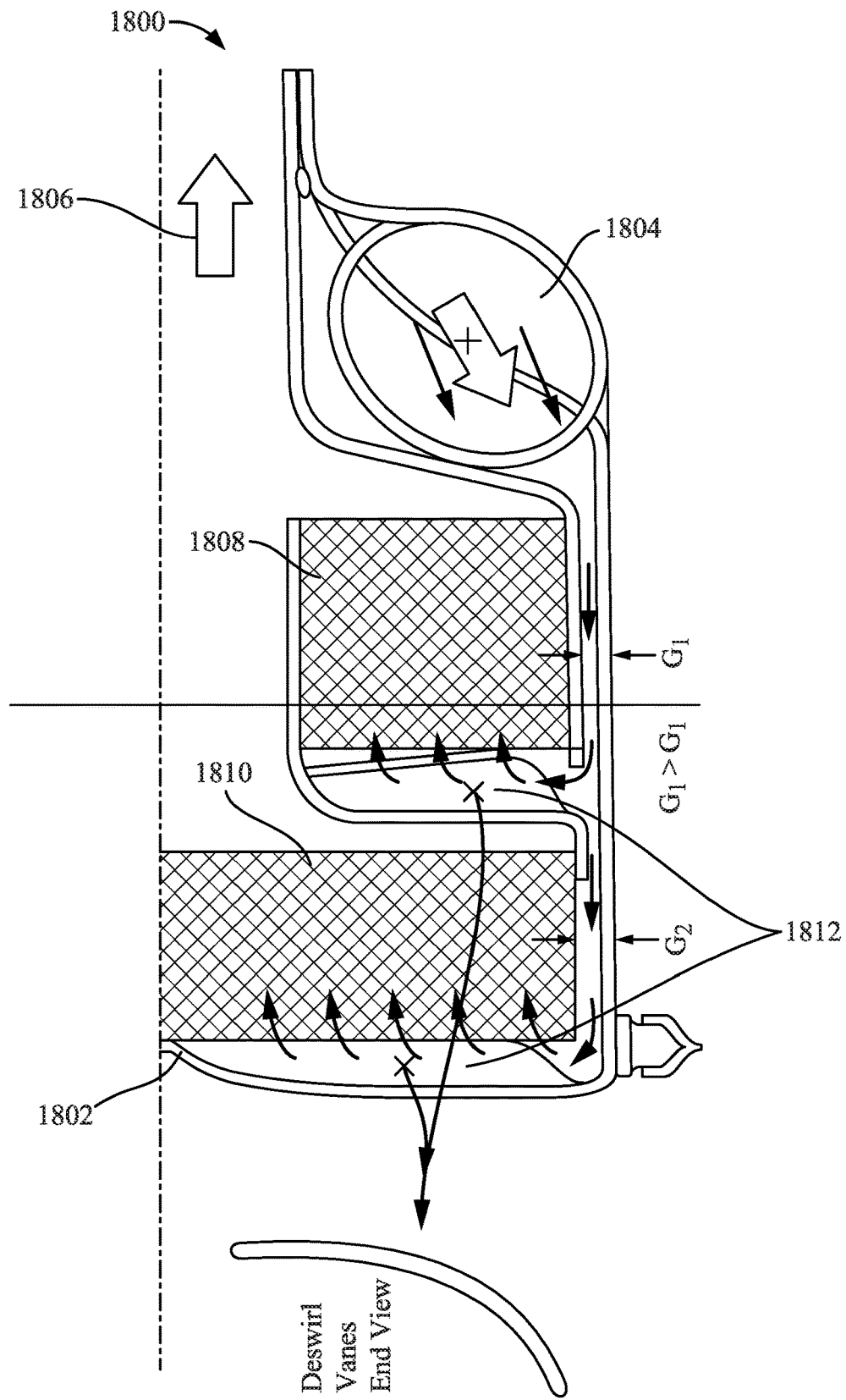
FIG. 18 shows a cross-sectional view of an air filtration system according to a further example embodiment.

FIG. 18 shows a cross-sectional view of a filtration system 1800 according to another example embodiment. The filtration system 1800 includes a housing 1802 having an inlet 1804 and an outlet 1806. The filtration system 1800 also includes two parallel stacked or nested coiled filter elements 1808 and 1810. The stacked or nested coiled filter elements 1808 and 1810 each are cylindrical filter elements including a wound filter media and are each arranged for axial flow filtration. That is, air to be filtered flows into a first axial face (i.e., an inlet face) of each of the filter elements 1808 and 1810, the air passes through the wound filter media, and filtered air exits the filter element through a second axial face (i.e., an outlet face) of each of the filter elements 1808 and 1810. The stacked or nested arrangement of the coiled filter elements 1808 and 1810 provides for increased dust capacity while avoiding excessively long axial filter dimensions over single filter element filtration systems (e.g., filtration systems 100 and 1700).

The inlet 1804 of the filtration system 1800 is shifted axially away from the filter elements 1808 and 1810 as compared to the radial air inlets 104 of filtration systems 100 and 1700. The inlet 1804 is given a sculpted involute air flow shape to establish a swirling air flow. Since the inlet 1804 is shifted axially away from the filter elements 1808 and 1810, the air flow is allowed to form the swirling flow without excessive pinch and pressure drop caused by the narrow gap between the filter elements 1808 and 1810 and the inner housing wall 1802 (e.g., as experienced in filtration systems 100 and 1700). The reduction of the pinch and pressure drop allows for a smaller radial gap between the housing 1802 and the filter elements 1808 and 1810.

Similar to filtration systems 100 and 1700, the filtration system 1800 includes de-swirl vanes 1812. The de-swirl vanes 1812 are positioned along the housing 1802 at positions adjacent to the inlet faces of the filter elements 1808 and 1810. The de-swirl vanes 1812 change the direction of the flow path from a tangential swirling flow (e.g., as shown in flow path 202 as best seen in FIGS. 2 and 3) into an axial flow toward the first axial faces of the filter elements 1808 and 1810. Accordingly, the de-swirl vanes 1812 align the air flow for entrance into the first axial faces (i.e., the inlet faces) of the filter elements 1808 and 1810.

The above-described filtration systems 100, 1700, and 1800 are described and shown as using substantially cylindrical filter elements. However, the filtration systems can be modified to accept other shaped filter elements such as oval or racetrack shape elements. The above-described filtration systems 100, 1700, and 1800 are described and shown as using only primary filter elements. However, the filtration systems 100, 1700, and 1800 can be designed to accommodate a secondary filter element (e.g., a filter element positioned after the primary filter element).

As described in further detail below with respect to FIGS. 19-26B, any of the above-described filter elements may be fitted with a vortex finder that functions as a physical barrier to prevent contaminants separated by a cyclonic pre-cleaner from re-entering the intake air flow upstream of the filter element.

Figure 19:
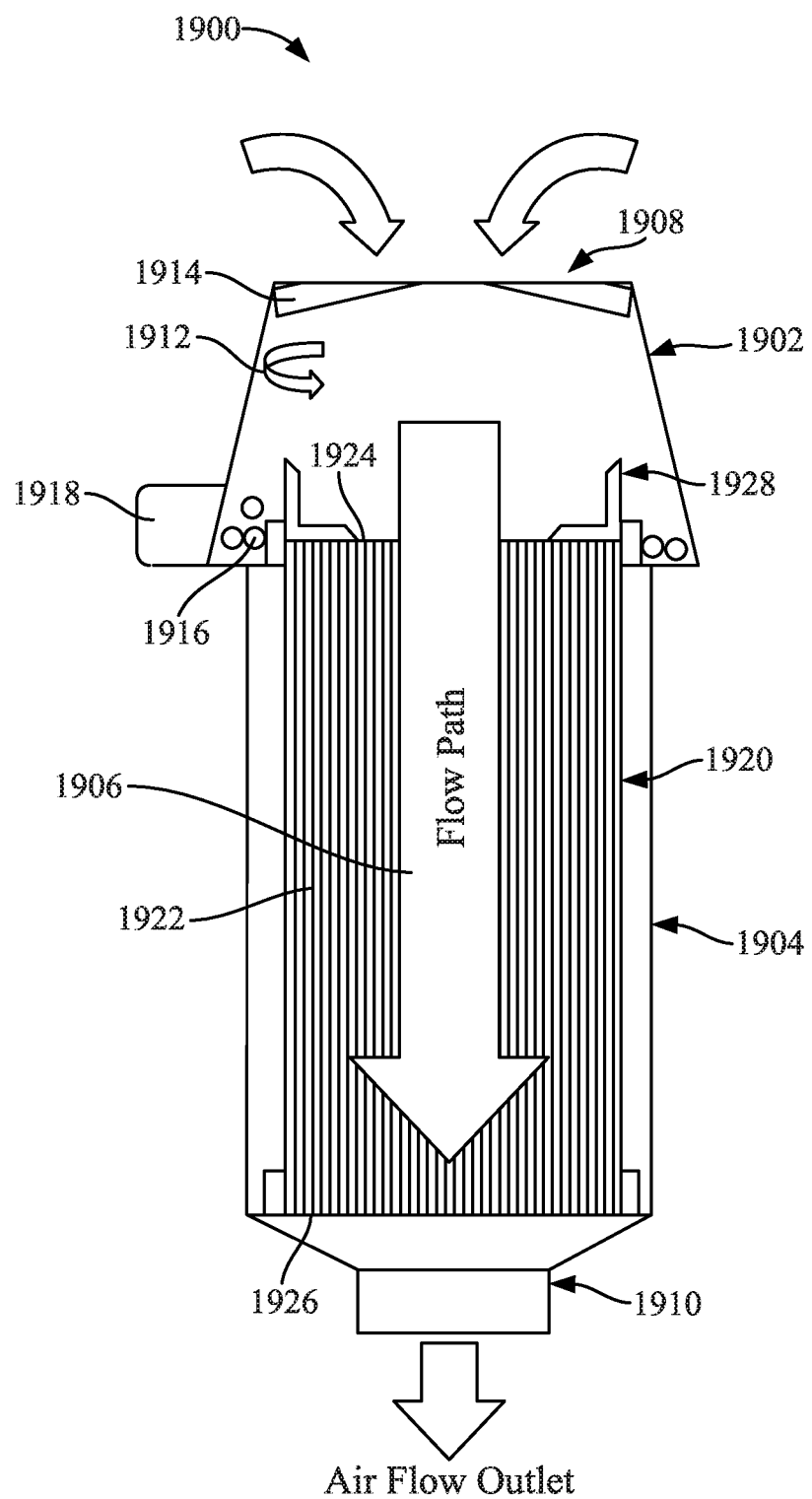
FIG. 19 shows a cross-sectional view of a filtration system according to an example embodiment.

Referring to FIG. 19, a cross-sectional view of a filtration system 1900 is shown according to an example embodiment. The filtration system 1900 includes a pre-cleaner housing 1902 and a filter housing 1904. The pre-cleaner housing 1902 is positioned upstream of the filter housing 1904 in an air flow path direction 1906. The pre-cleaner housing 1902 includes an inlet 1908 that receives air to be filtered. The filter housing 1904 includes an outlet 1910 that provides filtered air to a component (e.g., an internal combustion engine). The pre-cleaner housing 1902 is structured to cause the air flowing into the pre-cleaner housing 1902 through the inlet 1908 to move through the pre-cleaner housing 1902 in a swirling flow path 1912. As such, the pre-cleaner housing 1902 may include at least one vane or fin 1914 to induce the swirling flow of the air. The swirling flow path 1912 separates at least a portion of the contaminants 1916 from the air, such as dust and dirt, through the centrifugal force generated by the swirling flow path 1912. The separated contaminants 1916 can be removed from the pre-cleaner housing through a dust outlet 1918. Accordingly, the pre-cleaner housing 1902 removes at least a portion of the contaminants 1916 upstream of the filter housing 1904 and the filter element 1920.

The filter housing 1904 forms a central compartment that is structured to removably receive a filter element 1920. The filter element 1920 includes filter media 1922 positioned between a first end cap 1924 and a second end cap 1926. The filter media 1922 may include any of the above-described filter media, including tetrahedral filter media, fluted filter media, or the like. In some arrangements, the filter element 1920 is a cylindrical filter element, such as a coiled filter element in which the filter media 1922 is coiled (e.g., around a core, without a central core, etc.). The filter element 1920 is an axial flow filter element in which air to be filtered enters the filter element 1920 at or through the first end cap 1924, flows through the filter media 1922, and exits the filter element 1920 at the second end cap 1926. In some arrangements, the first end cap 1924 and/or the second end cap 1926 include a seal that forms a seal against the filter housing 1904 and/or the pre-cleaner housing 1902 thereby preventing air from bypassing the filter element 1920 as the air moves from the inlet 1908 to the outlet 1910 along the air flow path direction 1906. In some arrangements, the first end cap 1924 and the second end cap 1926 are open end caps.

As shown in FIG. 19, the filter element 1920 includes a vortex finder 1928. The vortex finder 1928 comprises a wall that extends from an inlet face of the filter media 1922 or from the first end cap and extends into the pre-cleaner housing 1902. In arrangements where the filter element 1920 is a cylindrical filter element, the vortex finder 1928 comprises a circumferential wall, with the circumferential wall forming an uninterrupted loop (e.g., a circular uninterrupted loop). The vortex finder 1928 prevents contaminant 1916 separated from the air in the pre-cleaner housing 1902 from entering the filter element 1920. The vortex finder 1928 may be integrated with the filter element 1920 (e.g., as a urethane or overmolded part coupled to the first end cap 1924).

Figure 20:
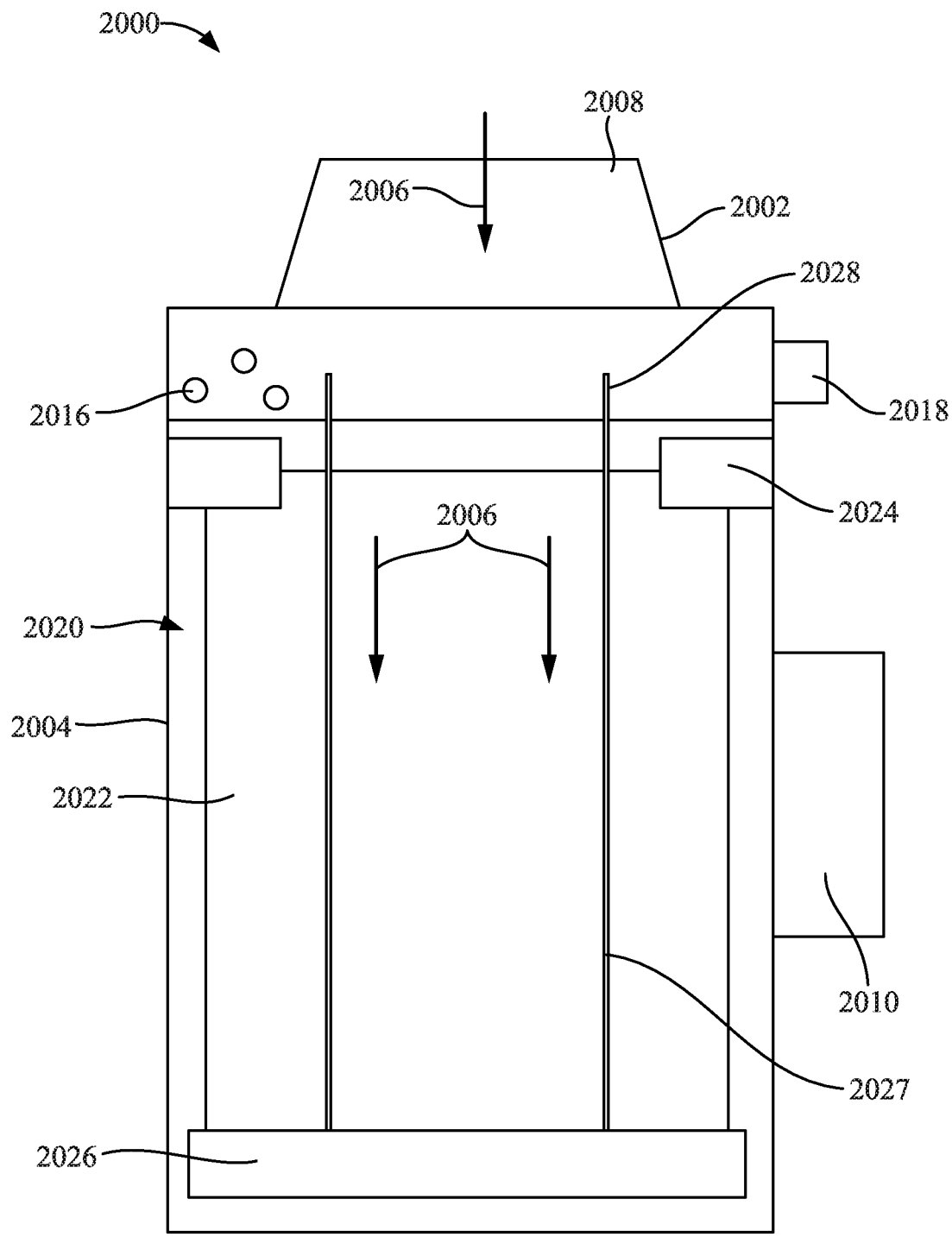
FIG. 20 shows a cross-sectional view of a filtration system according to another example embodiment.

Referring to FIG. 20, a cross-sectional view of a filtration system 2000 is shown according to an example embodiment. The filtration system 2000 is similar to the filtration system 1900. A primary difference between the filtration system 1900 and the filtration system 2000 is the flow path through the filter element and the arrangement of the vortex finder. The filtration system 2000 includes a pre-cleaner housing 2002 and a filter housing 2004. The pre-cleaner housing 2002 is positioned upstream of the filter housing 2004 in an air flow path direction 2006. The pre-cleaner housing 2002 includes an inlet 2008 that receives air to be filtered. The filter housing 2004 includes an outlet 2010 that provides filtered air to a component (e.g., an internal combustion engine). The pre-cleaner housing 2002 is structured to cause the air flowing into the pre-cleaner housing 2002 through the inlet 2008 to move through the pre-cleaner housing 2002 in a swirling flow path (e.g., in a similar manner as described above with respect to the filtration system 1900). As such, the pre-cleaner housing 2002 may include at least one vane or fin to induce the swirling flow of the air. The swirling flow path separates at least a portion of the contaminants 2016 from the air, such as dust and dirt, through the centrifugal force generated by the swirling air flow path. The separated contaminants 2016 can be removed from the pre-cleaner housing through a dust outlet 2018. Accordingly, the pre-cleaner housing 2002 removes at least a portion of the contaminants 2016 upstream of the filter housing 2004 and the filter element 2020.

The filter housing 2004 forms a central compartment that is structured to removably receive a filter element 2020. The filter element 2020 includes filter media 2022 positioned between a first end cap 2024 and a second end cap 2026. The filter media 2022 may include any of the above-described filter media, including pleated filter media or the like. In some arrangements, the filter element 2020 is a cylindrical filter element. In other arrangements, the filter element 2020 is a conical filter element. The filter element 2020 is an inside-out flow filter media. Accordingly, air to be filtered enters an inner space of the filter media 2022 that is defined by a center tube 2027 of the filter element 2020. Air flows into the inner space, through the center tube 2027 (e.g., through perforations in the center tube 2027), through the filter media 2022, and out the outlet 2010. In some arrangements, the filter element 2020 is a cylindrical filter element. The first end cap 2024 includes a seal that forms a seal against the filter housing 2004 and/or the pre-cleaner housing 2002 thereby preventing air from bypassing the filter element 2020 as the air moves from the inlet 2008 to the outlet 2010 along the air flow path direction 2006. The first end cap 2024 is an open end cap and the second end cap 2026 is a closed end cap.

As shown in FIG. 20, the filter element 2020 includes a vortex finder 2028. The vortex finder 2028 comprises a wall that extends from the center tube 2027 beyond the first end cap 2024 in an axial direction and extends into the pre-cleaner housing 2002. In arrangements where the filter element 2020 is a cylindrical filter element, the vortex finder 2028 comprises a circumferential wall, with the circumferential wall forming an uninterrupted loop (e.g., a circular uninterrupted loop). The vortex finder 2028 prevents contaminant 2016 separated from the air in the pre-cleaner housing 2002 from entering the inner space of the filter media 2022. As noted above, the vortex finder 2028 is an extension of the center tube 2027.

Figure 21:
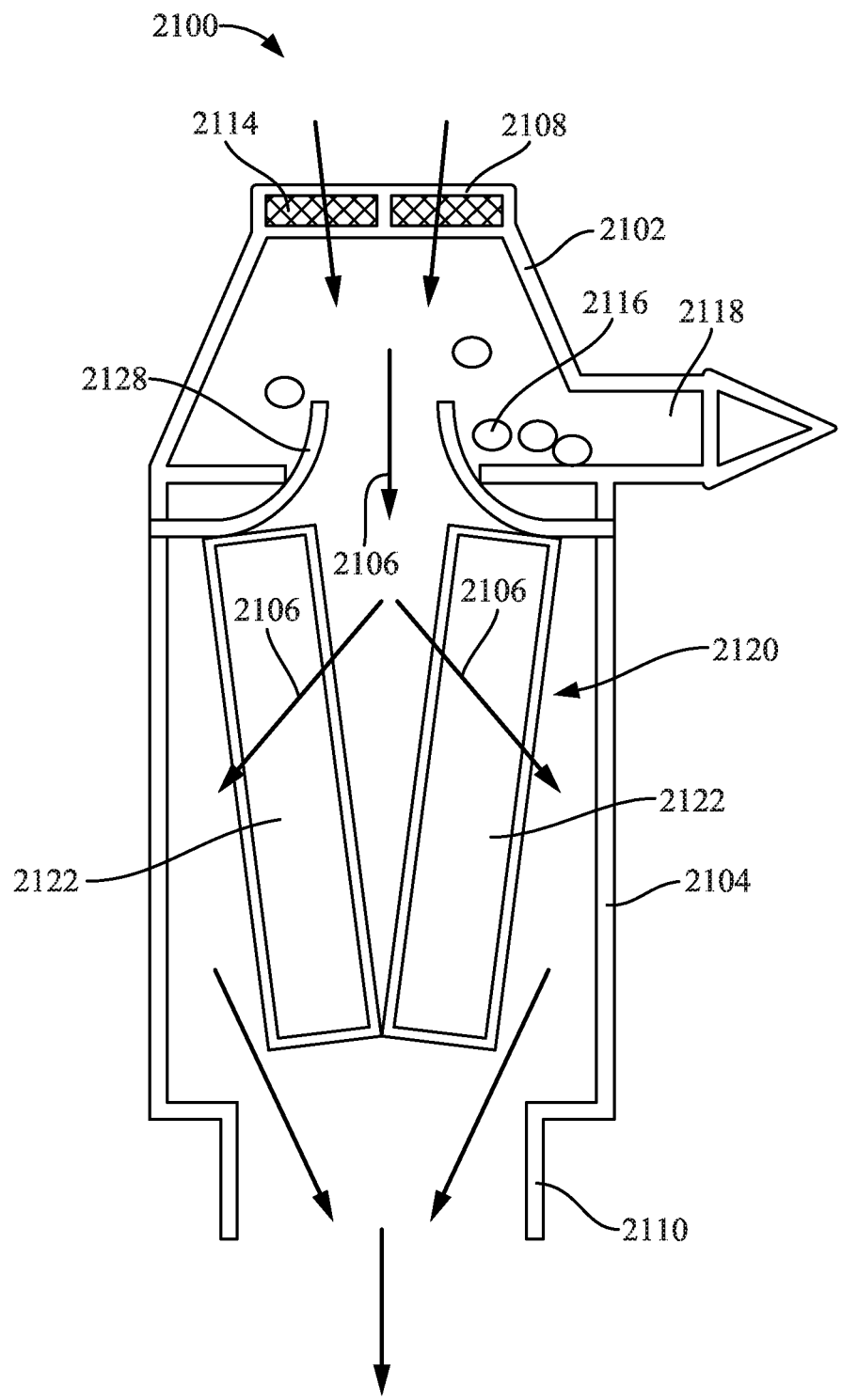
FIG. 21 shows a cross-sectional view of a filtration system according to a further example embodiment.

Referring to FIG. 21, a cross-sectional view of a filtration system 2100 is shown according to an example embodiment. The filtration system 2100 is similar to the above-described filtration systems 1900 and 2000. Here, however, the filtration system 2100 includes a V-shaped filter element having an inside-out flow pattern. The filtration system 2100 includes a pre-cleaner housing 2102 and a filter housing 2104. The pre-cleaner housing 2102 is positioned upstream of the filter housing 2104 in an air flow path direction 2106. The pre-cleaner housing 2102 includes an inlet 2108 that receives air to be filtered. The filter housing 2104 includes an outlet 2110 that provides filtered air to a component (e.g., an internal combustion engine). The pre-cleaner housing 2102 is structured to cause the air flowing into the pre-cleaner housing 2102 through the inlet 2108 to move through the pre-cleaner housing 2102 in a swirling flow path (e.g., in a similar manner as described above with respect to the filtration system 1900). As such, the pre-cleaner housing 2102 may include at least one vane or fin 2114 to induce the swirling flow of the air. The swirling flow path separates at least a portion of the contaminants 2116 from the air, such as dust and dirt, through the centrifugal force generated by the swirling air flow path. The separated contaminants 2116 can be removed from the pre-cleaner housing through a dust outlet 2118. Accordingly, the pre-cleaner housing 2102 removes at least a portion of the contaminants 2116 upstream of the filter housing 2104 and the filter element 2120.

The filter housing 2104 forms a central compartment that is structured to removably receive a filter element 2120. The filter element 2120 includes two panel filters 2122 (i.e., pleat blocks) each having filter media and being arranged such that a cross-section of the filter element 2120 has a V-shape. The panel filters 2122 may be retained in the V-shape position by a frame. The filter media of the panel filters 2122 may include any of the above-described filter media, including pleated filter media or the like. In other arrangements, the filter element 2120 includes filter media arranged in a conical or cylindrical shape (e.g., as described above with respect to FIG. 20). In some arrangements, the frame includes a seal that forms a seal against the filter housing 2104 and/or the pre-cleaner housing 2102 thereby preventing air from bypassing the filter element 2120 as the air moves from the inlet 2108 to the outlet 2110 along the air flow path direction 2106.

As shown in FIG. 21, the filter element 2120 includes a vortex finder 2128. The vortex finder 2128 comprises a wall that extends from the filter element 2120 into the pre-cleaner housing 2102. The vortex finder 2128 prevents contaminant 2116 separated from the air in the pre-cleaner housing 2102 from entering the filter element 2120. In the embodiment shown in FIG. 21, the vortex finder 2128 comprises a wall forming a circumferential loop, with a longitudinal surface of the wall being curved. The vortex finder 2128 may be integrated with the filter element 2120 (e.g., as a urethane or overmolded part coupled to the frame). In some arrangements, the vortex finder 2128 is compressed between the pre-cleaner housing 2102 and the filter housing 2104 thereby creating an axial seal that prevents intake air from bypassing the filter element 2120 and thereby holding the filter element 2120 in place within the filter housing 2104.

Figure 22:
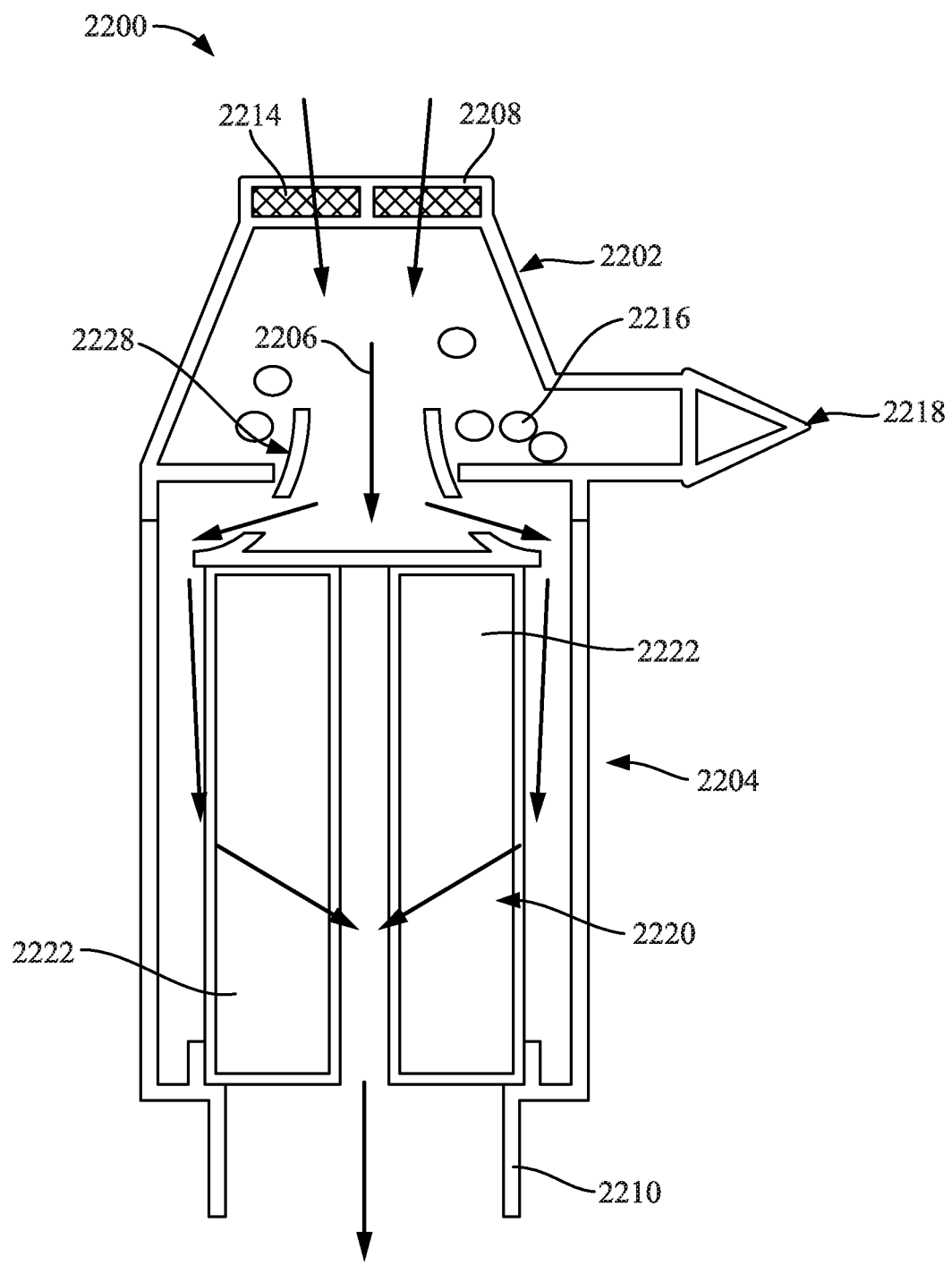
FIG. 22 shows a cross-sectional view of a filtration system according to an additional example embodiment.

Referring to FIG. 22, a cross-sectional view of a filtration system 2200 is shown according to an example embodiment. The filtration system 2200 is similar to the above-described filtration system 2100. Here, however, the filtration system 2200 includes a two-panel parallel arranged filter element having an outside-in flow pattern. The filtration system 2200 includes a pre-cleaner housing 2202 and a filter housing 2204. The pre-cleaner housing 2202 is positioned upstream of the filter housing 2204 in an air flow path direction 2206. The pre-cleaner housing 2202 includes an inlet 2208 that receives air to be filtered. The filter housing 2204 includes an outlet 2210 that provides filtered air to a component (e.g., an internal combustion engine). The pre-cleaner housing 2202 is structured to cause the air flowing into the pre-cleaner housing 2202 through the inlet 2208 to move through the pre-cleaner housing 2202 in a swirling flow path (e.g., in a similar manner as described above with respect to the filtration system 1900). As such, the pre-cleaner housing 2202 may include at least one vane or fin 2214 to induce the swirling flow of the air. The swirling flow path separates at least a portion of the contaminants 2216 from the air, such as dust and dirt, through the centrifugal force generated by the swirling air flow path. The separated contaminants 2216 can be removed from the pre-cleaner housing through a dust outlet 2218. Accordingly, the pre-cleaner housing 2202 removes at least a portion of the contaminants 2216 upstream of the filter housing 2204 and the filter element 2220.

The filter housing 2204 forms a central compartment that is structured to removably receive a filter element 2220. The filter element 2220 includes filter media 2222 arranged in a cylindrical manner. The filter media 2222 may include any of the above-described filter media, including pleated filter media or the like. In other arrangements, the filter element 2220 includes two panel filters each having filter media 2222 and being arranged in a parallel manner. In such arrangements, the panel filters may be retained in the shown shape position by a frame. In further arrangements, the filter media 2222 of the filter element 2220 is arranged in a cylindrical or conical manner (e.g., as described above with respect to FIG. 20). In some arrangements, the filter element 2220 includes a frame that may include a seal that forms a seal against the filter housing 2204 (shown at the bottom of the filter housing 2204 adjacent to the outlet 2210) thereby preventing air from bypassing the filter element 2220 as the air moves from the inlet 2208 to the outlet 2210 along the air flow path direction 2206. A top portion 2219 of the frame closes off a top end of the filter element 2220 adjacent to the pre-cleaner housing 2202 such that intake air cannot pass into an inner space of the filter element 2220 without first flowing through the filter media.

As shown in FIG. 22, the filter element 2220 includes a vortex finder 2228. The vortex finder 2228 comprises a wall that extends from the filter element 2220 into the pre-cleaner housing 2202. The vortex finder 2228 prevents contaminant 2216 separated from the air in the pre-cleaner housing 2202 from entering the filter element 2220. In the embodiment shown in FIG. 22, the vortex finder 2228 comprises a wall forming a circumferential loop, with a longitudinal surface of the wall being curved. The vortex finder 2228 may be integrated with the filter element 2220 (e.g., as a urethane or overmolded part coupled to the frame). In some arrangements, the vortex finder 2228 is compressed between the pre-cleaner housing 2202 and the filter housing 2204 thereby creating an axial seal that prevents intake air from bypassing the filter element 2220 and thereby holding the filter element 2220 in place within the filter housing 2204. Since the filter element 2220 is an outside-in flow filter element, the vortex finder includes a plurality of openings 2230 that allow the intake air to flow through the vortex finder 2228 to the outside of the filer element 2220 such that the intake air can then pass through the filter media and out the outlet 2210.

Figure 23:
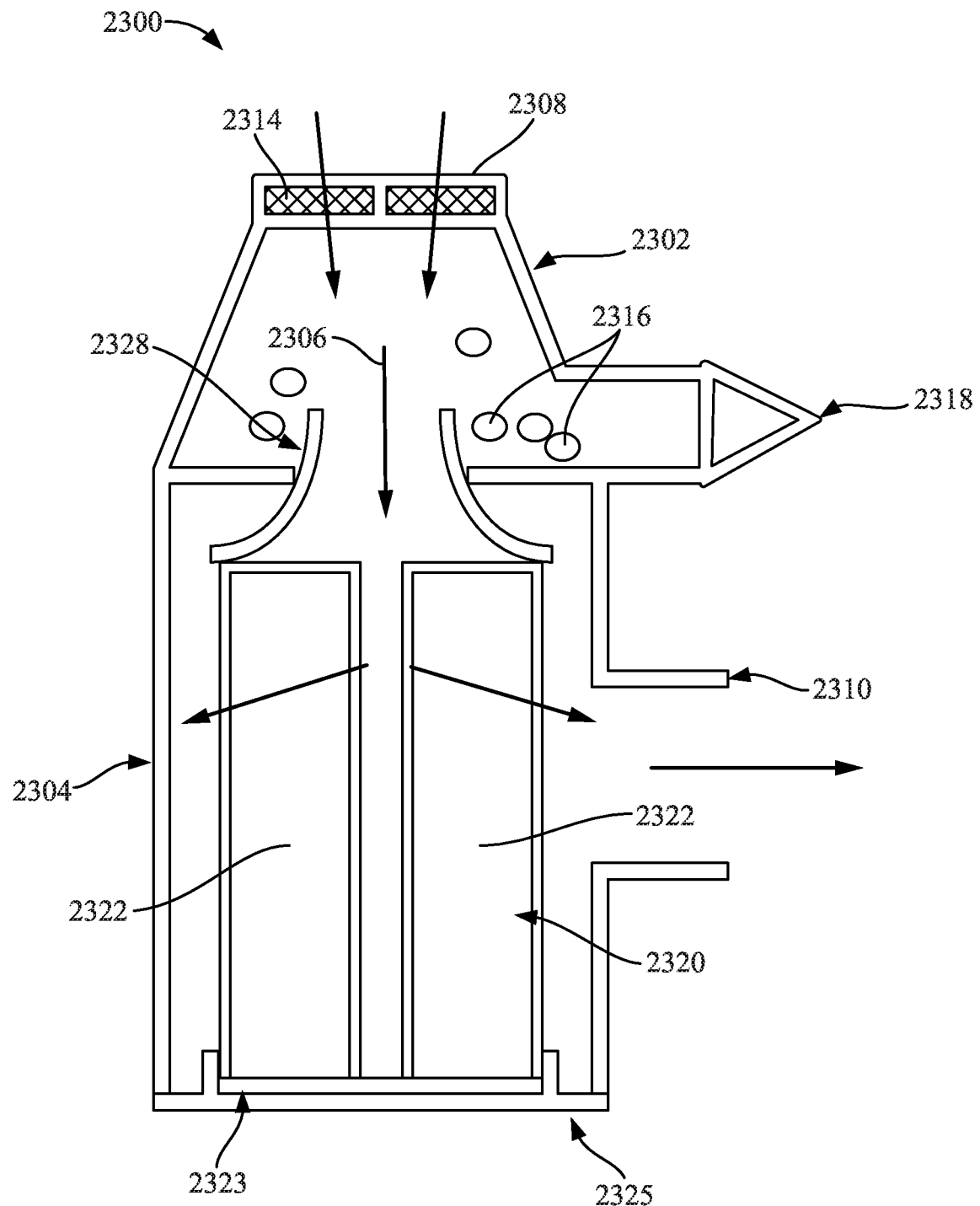
FIG. 23 shows a cross-sectional view of a filtration system according to an example embodiment.

Referring to FIG. 23, a cross-sectional view of a filtration system 2300 is shown according to an example embodiment. The filtration system 2300 is similar to the above-described filtration system 2100. Here, however, the filtration system 2300 includes a filter element having two parallel spaced apart pleat blocks that allow for an inside-out flow pattern instead of the V-shaped filter element 2120 of the filtration system 2100.

The filtration system 2300 includes a pre-cleaner housing 2302 and a filter housing 2304. The pre-cleaner housing 2302 is positioned upstream of the filter housing 2304 in an air flow path direction 2306. The pre-cleaner housing 2302 includes an inlet 2308 that receives air to be filtered. The filter housing 2304 includes an outlet 2310 that provides filtered air to a component (e.g., an internal combustion engine). Unlike the filtration system 2100, the outlet 2310 is a side or radial outlet. The pre-cleaner housing 2302 is structured to cause the air flowing into the pre-cleaner housing 2302 through the inlet 2308 to move through the pre-cleaner housing 2302 in a swirling flow path (e.g., in a similar manner as described above with respect to the filtration system 1900). As such, the pre-cleaner housing 2302 may include at least one vane or fin 2314 to induce the swirling flow of the air. The swirling flow path separates at least a portion of the contaminants 2316 from the air, such as dust and dirt, through the centrifugal force generated by the swirling air flow path. The separated contaminants 2316 can be removed from the pre-cleaner housing through a dust outlet 2318. Accordingly, the pre-cleaner housing 2302 removes at least a portion of the contaminants 2316 upstream of the filter housing 2304 and the filter element 2320.

The filter housing 2304 forms a central compartment that is structured to removably receive a filter element 2320. The filter element 2320 includes filter media 2322 arranged in a cylindrical manner. The filter media 2322 may include any of the above-described filter media, including pleated filter media or the like. In other arrangements, the filter media 2322 is arranged as two panel filters each having the filter media 2322 and being arranged such that the panel filters are parallel to each other. The panel filters may be retained in the shape by a frame. In further arrangements, the filter media 2322 of the filter element 2320 is arranged in a cylindrical or conical manner (e.g., as described above with respect to FIG. 20). The filter element 2320 includes a frame having a bottom endcap 2323. In some arrangements, the frame includes a seal mechanism that forms a seal against the filter housing 2304 and/or the pre-cleaner housing 2302, thereby preventing air from bypassing the filter element 2320 as the air moves from the inlet 2308 to the outlet 2310 along the flow path 2306. In some arrangements, the filter housing 2304 includes a removable cover 2325. The removable cover 2325 receives the endcap 2323 when the filter element 2320 is installed in the filter housing 2304.

As shown in FIG. 23, the filter element 2320 includes a vortex finder 2328. The vortex finder 2328 comprises a wall that extends from the filter element 2320 into the pre-cleaner housing 2302. The vortex finder 2328 prevents contaminant 2316 separated from the air in the pre-cleaner housing 2302 from entering the filter element 2320. In the embodiment shown in FIG. 23, the vortex finder 2328 comprises a wall forming a circumferential loop, with a longitudinal surface of the wall being curved. The vortex finder 2328 may be integrated with the filter element 2320 (e.g., as a urethane or overmolded part coupled to the frame). In some arrangements, the vortex finder 2328 is compressed between the pre-cleaner housing 2302 and the filter housing 2304 thereby creating an axial seal that prevents intake air from bypassing the filter element 2320 and thereby holding the filter element 2320 in place within the filter housing 2304.

Figure 24:
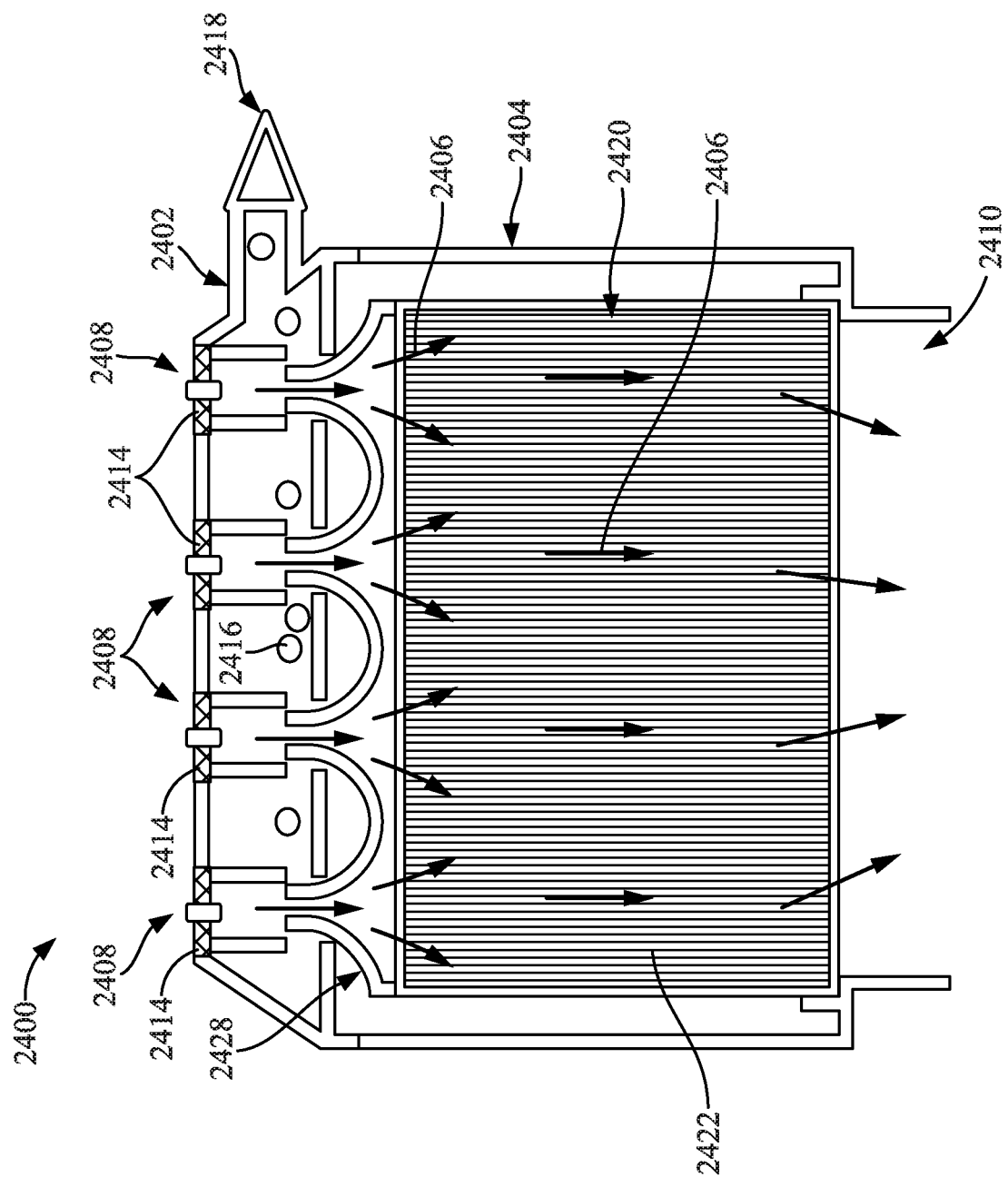
FIG. 24 shows a cross-sectional view of a filtration system according to another example embodiment.

Referring to FIG. 24, a cross-sectional view of a filtration system 2400 is shown according to an example embodiment. The filtration system 2400 is similar to the above-described filtration systems 1900, 2000, 2100, 2200, and 2300. In this embodiment, however, the filtration system 2400 includes a plurality of pre-cleaners and vortex finders. The filtration system 2400 includes a pre-cleaner housing 2402 and a filter housing 2404. The pre-cleaner housing 2402 is positioned upstream of the filter housing 2404 in an air flow path direction 2406. The pre-cleaner housing 2402 includes a plurality of air inlets 2408 that receives air to be filtered. The filter housing 2404 includes an outlet 2410 that provides filtered air to a component (e.g., an internal combustion engine). The pre-cleaner housing 2402 is structured to cause the air flowing into the pre-cleaner housing 2402 through the inlet 2408 to move through the pre-cleaner housing 2402 in a swirling flow path (e.g., in a similar manner as described above with respect to the filtration system 1900). As such, each of the inlets 2408 has an associated swirler 2414 (e.g., at least one vane or fin) that induces the swirling flow of the air. The swirling flow path separates at least a portion of the contaminants 2416 from the air, such as dust and dirt, through the centrifugal force generated by the swirling air flow path. The separated contaminants 2416 can be removed from the pre-cleaner housing through a dust outlet 2418. Accordingly, the pre-cleaner housing 2402 removes at least a portion of the contaminants 2416 upstream of the filter housing 2404 and the filter element 2420.

The filter housing 2404 forms a central compartment that is structured to removably receive a filter element 2420. The filter element 2420 includes filter media arranged in a pleat block 2422. The filter media may be retained in the shape shown in FIG. 24 by a frame. The filter media of the pleat block 2422 may include any of the above-described filter media, including tetrahedral filter media, fluted filter media, pleated filter media, or the like. In some arrangements, the frame includes a seal that forms a seal against the filter housing 2404 and/or the pre-cleaner housing 2402 thereby preventing air from bypassing the filter element 2420 as the air moves from the inlet 2408 to the outlet 2410 along the air flow path direction 2406.

As shown in FIG. 24, the filter element 2420 includes a vortex finder 2428. In some arrangements, each of the inlets 2408 includes an associated vortex finder 2428. The vortex finder 2428 comprises a wall that extends from the filter element 2420 into the pre-cleaner housing 2402. The vortex finder 2428 prevents contaminant 2416 separated from the air in the pre-cleaner housing 2402 from entering the filter element 2420. The vortex finder 2428 may be integrated with the filter element 2420 (e.g., as a urethane or overmolded part coupled to the frame). Accordingly, inspection of the filter housing 2404 is easier because the vortex finder 2428 is not affixed to the filter housing 2404. In some arrangements, the vortex finder 2428 is compressed between the pre-cleaner housing 2402 and the filter housing 2404 thereby creating an axial seal that prevents intake air from bypassing the filter element 2420 and thereby holding the filter element 2420 in place within the filter housing 2404.

Any of the above-described filter elements of FIG. 19 through FIG. 23 may be modified to include a plurality of smaller pre-cleaners and corresponding vortex finders as shown in FIG. 24 as opposed to the large preclear and corresponding vortex finder shown in FIGS. 19 through 23.

Figure 25B:
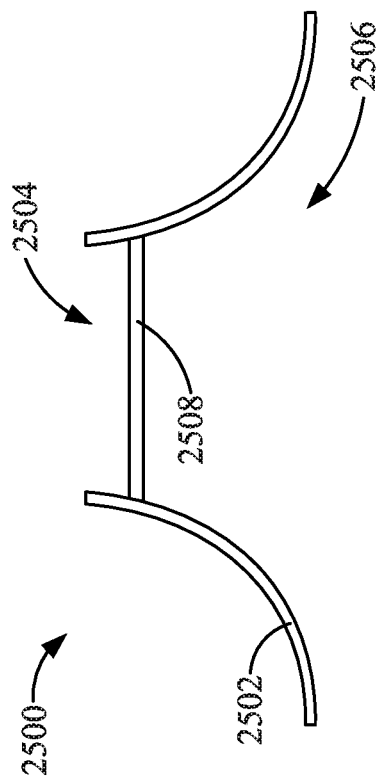
FIG. 25B shows a cross-sectional view of the vortex finder of FIG. 25A.
Figure 25A:
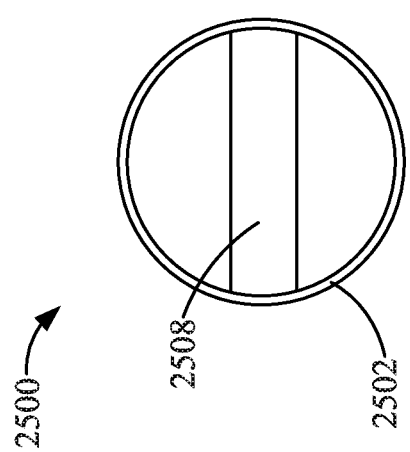
FIG. 25A shows a top view of a vortex finder according to an example embodiment.

Referring to FIGS. 25A and 25B, views of a vortex finder 2500 are shown. FIG. 25A shows a top view of the vortex finder 2500. FIG. 25B shows a side cross-sectional view of the vortex finder 2500. The vortex finder 2500 functions in the same manner as described above with respect to the vortex finders of filtration systems 1900-2400. Accordingly, the vortex finder 2500 may be used in place of the vortex finders of any of filtration systems 1900-2400. The vortex finder 2500 includes a main body 2502. The main body 2502 defines a top opening 2504 and a bottom opening 2506. The vortex finder 2500 includes a handle 2508 that extends across the top opening 2504. In some arrangements, the handle 2508 is rotated 90 degrees from the orientation shown in FIGS. 25A and 25B thereby aligning the thinner portion of the handle 2508 in the direction of flow, which would pose less blockage to flow through the vortex finder 2500. When the vortex finder 2500 is coupled to a filter element, the handle 2508 provides a gripping area for a technician that is either installing the filter element into a filter housing or removing the filter element from the filter housing.

Figure 26B:
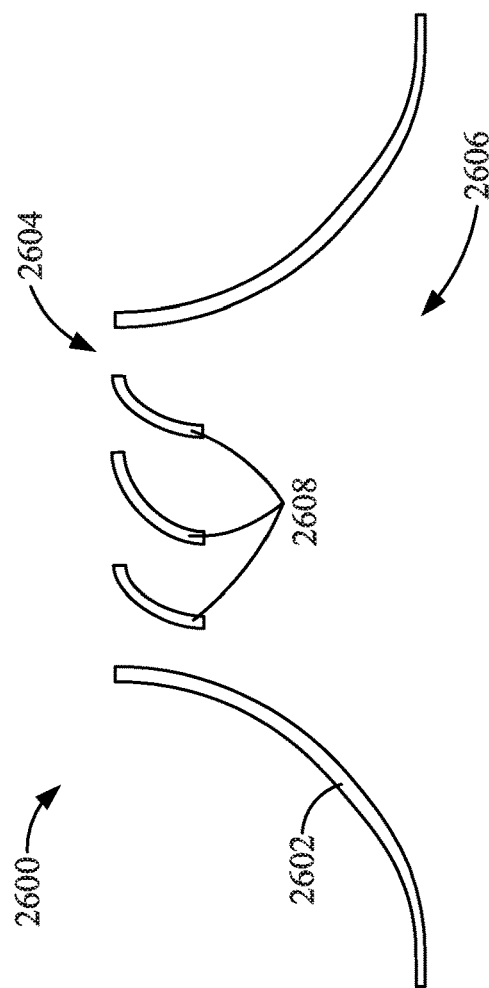
FIG. 26B shows a cross-sectional view of the vortex finder of FIG. 26A.
Figure 26A:
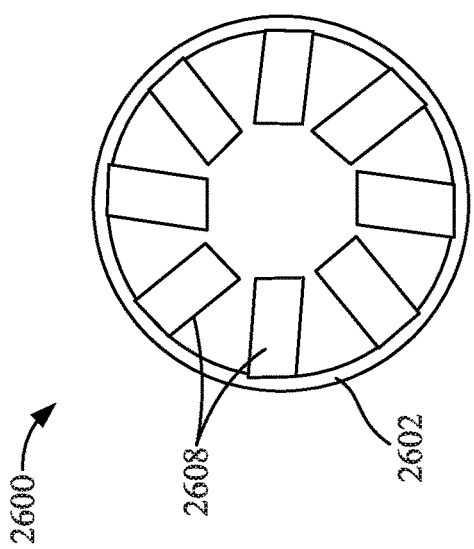
FIG. 26A shows a top view of a vortex finder according to another example embodiment.

Referring to FIGS. 26A and 26B, views of a vortex finder 2600 are shown. FIG. 26A shows a top view of the vortex finder 2600. FIG. 26B shows a side cross-sectional view of the vortex finder 2600. The vortex finder 2600 functions in the same manner as described above with respect to the vortex finders of filtration systems 1900-2400. Accordingly, the vortex finder 2600 may be used in place of the vortex finders of any of filtration systems 1900-2400. The vortex finder 2600 includes a main body 2602. The main body 2602 defines a top opening 2604 and a bottom opening 2606. The vortex finder 2600 includes a plurality of de-swirl vanes 2608 that extends across the top opening 2604. In an alternate arrangement, the plurality of de-swirl vanes 2608 can be positioned across the bottom opening 2606 or at a position between the top opening 2604 and the bottom opening 2606. The plurality of de-swirl vanes 2608 change the air flow through the filtration system from a swirling flow (as caused by the pre-cleaner of the filtration system) back into an axial flow. In doing so, the plurality of de-swirl vanes 2608 reduce the pressure drop through the filtration system. The described de-swirl vanes 2608 can be included in any of the above-described filtration systems.

Any of the above described vortex finders, vortex finders 1928, 2028, 2128, 2228, 2328, 2428, 2500, and 2600, can be modified for filtration systems having different arrangements. For example, the vortex finders can be modified to work with a pre-cleaner housing that includes a tangential air inlet instead of the axial flow air inlet shown in FIGS. 19 through 24. Additionally, the described vortex finders can be constructed as a detachable component from the filter element such that the vortex finder can be reused with replacement filter elements.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. An air filtration system comprising:
a housing defining a central compartment therein, the housing including a radial air inlet and an axial air outlet positioned near a first end of the housing;
a cover removably coupled to a second end of the housing;
a filter element positioned within the central compartment of the housing, the filter element including a wound filter media, the filter element arranged for axial flow filtration such that air to be filtered flows into a first axial face of the filter element, flows through the filter media, and flows out of the filter element at a second axial face of the filter element; and
a plurality of de-swirl vanes positioned on the cover, the plurality of de-swirl vanes routing a flow of air into the filter element by changing the flow of air from a swirling flow to an axial flow towards the first axial face of the filter element, the plurality of de-swirl vanes are spiral in shape.

2. The system of claim 1, wherein the flow of air enters the housing through the air inlet and is routed around the filter element in a swirling manner prior to the flow of air reaching the de-swirl vanes.

3. The system of claim 1, further comprising a circumferential extension coupled to the filter element, the circumferential extension extending from the first axial face of the filter element and engaging outer portions of the de-swirl vanes.

4. The system of claim 3, wherein the circumferential extension is angled away from a central axis of the filter element, thereby diverting contaminant in the flow of air towards an inner wall of the housing.

5. The system of claim 1, further comprising circumferential vanes surrounding a portion of the filter element, the circumferential vanes creating or enhancing the swirling flow.

6. The system of claim 1, wherein the filter element is a first filter element, and wherein the system further comprises a second filter element arranged in a parallel flow configuration with the first filter element.

7. The system of claim 1, wherein the filter element includes a vortex finder that forms a physical barrier to prevent contaminants separated by the swirling flow from entering the filter element.

8. The system of claim 7, wherein the vortex finder includes a handle.

9. The system of claim 7, wherein the vortex finder is removably coupled to the filter element.

* * * * *